(12) United States Patent
Ogikubo

(10) Patent No.: US 7,895,634 B2
(45) Date of Patent: Feb. 22, 2011

(54) DATA PROCESSING METHOD, DATA PROCESSING APPARATUS, AND PROGRAM AND DATA RECORDING MEDIUM THEREFOR

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1518 days.

(21) Appl. No.: 10/713,830

(22) Filed: Nov. 14, 2003

(65) Prior Publication Data

US 2004/0143679 A1 Jul. 22, 2004

(30) Foreign Application Priority Data

Nov. 15, 2002 (JP) .............................. 2002-332653

(51) Int. Cl.
*H04N 7/16* (2006.01)
(52) U.S. Cl. ........................ 725/136; 725/135; 725/139; 725/142; 386/6; 386/7; 386/68
(58) Field of Classification Search ......... 725/114–117, 725/135, 136, 139, 142; 386/68, 6, 7
See application file for complete search history.

(56) References Cited

U.S. PATENT DOCUMENTS

| 5,987,210 | A | 11/1999 | Iggulden et al. | |
| 6,434,746 | B1* | 8/2002 | Nagashima et al. | 725/5 |
| 6,760,536 | B1* | 7/2004 | Amir et al. | 386/68 |
| 7,013,477 | B2* | 3/2006 | Nakamura et al. | 725/32 |
| 2002/0039481 | A1* | 4/2002 | Jun et al. | 386/68 |
| 2002/0191950 | A1* | 12/2002 | Wang | 386/46 |

FOREIGN PATENT DOCUMENTS

| EP | 0 680 214 | 11/1995 |
| JP | 8 307847 | 11/1996 |
| JP | 10 32809 | 2/1998 |
| JP | 11 3559 | 1/1999 |
| JP | 11 8834 | 1/1999 |
| JP | 11-018057 | 1/1999 |
| JP | 2000-115712 | 4/2000 |
| JP | 2001 36851 | 2/2001 |
| JP | 2001 52421 | 2/2001 |
| JP | 2002-16204 | 1/2002 |
| JP | 2002 77797 | 3/2002 |

(Continued)

*Primary Examiner*—John W Miller
*Assistant Examiner*—John Schnurr
(74) *Attorney, Agent, or Firm*—Frommer Lawrence & Haug LLP; William S. Frommer

(57) ABSTRACT

An editing apparatus captures material data of audio and/or image data, edits the material data and generates main data. When an instruction to limit reproduction operation of the main data is made, the associated information including limitation information for limiting the reproduction operation of the main data so as to get a desired quality of content-representation is generated. The associated information is combined with the edited main data so that they are transmitted as the content data. Content-sending apparatus generates sending-data based on the data to transmit it. When the associated information including limitation information for limiting the reproduction operation of the main data is combined with the main data, content-reproducing apparatus performs reproduction operation based on the limitation information and controls reproduction speed, display size and the like. Content-representation apparatus represents audio and image at desired quality.

53 Claims, 18 Drawing Sheets

FOREIGN PATENT DOCUMENTS

| | | |
|---|---|---|
| JP | 2002 251870 | 9/2002 |
| JP | 2002 314912 | 10/2002 |
| JP | 2002-320203 | 10/2002 |
| JP | 2002 320212 | 10/2002 |
| JP | 2003 333529 | 11/2003 |
| JP | 2004 180290 | 6/2004 |
| WO | WO 98 20675 | 5/1998 |
| WO | WO 01 35647 | 5/2001 |
| WO | WO 01 35649 | 5/2001 |

* cited by examiner

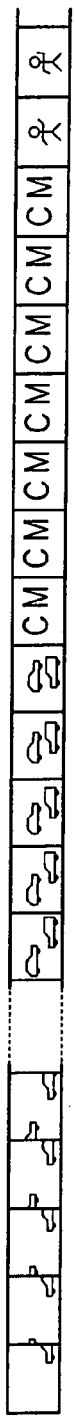
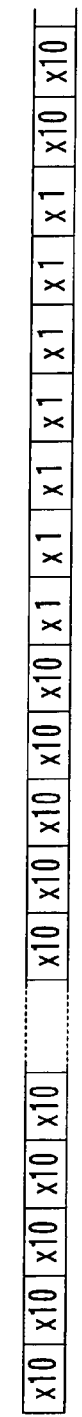
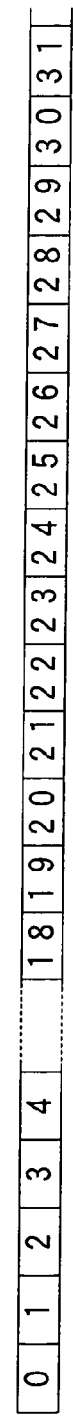
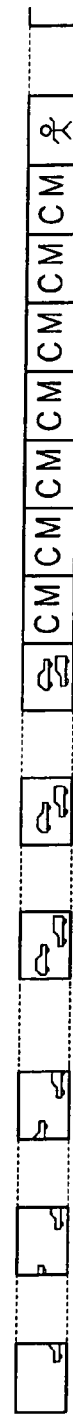
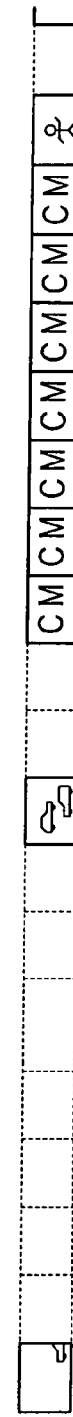

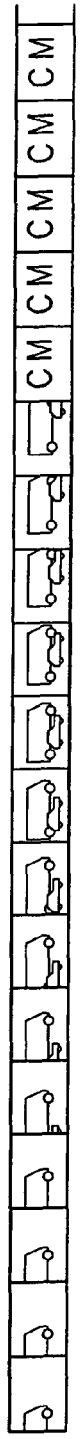
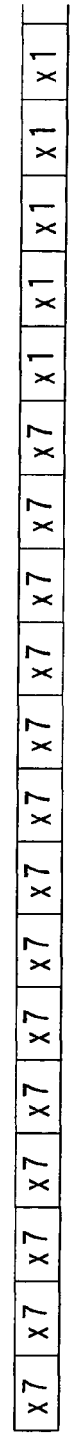
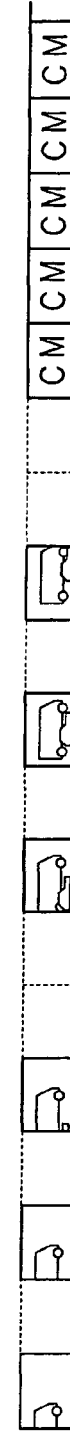
FIG. 13A (DVz)
FIG. 13B (DMz-FRs)
FIG. 13C (DMc-LM)
FIG. 13D (AN)
FIG. 13E (AN)
FIG. 13F (Svz)

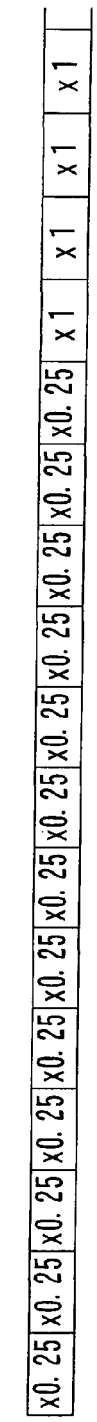
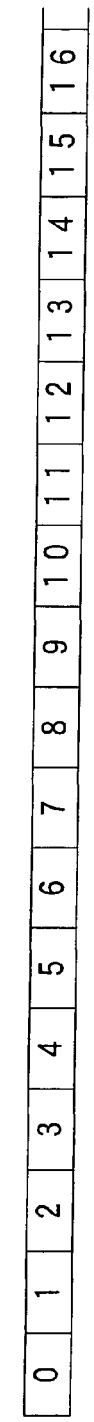
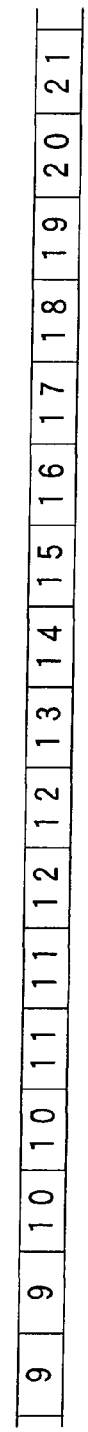
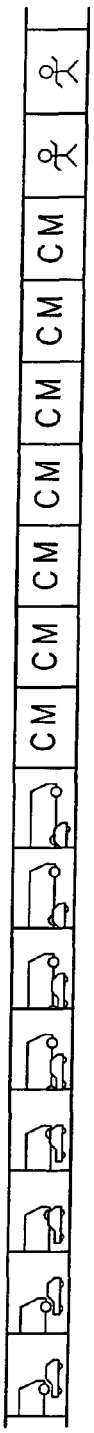

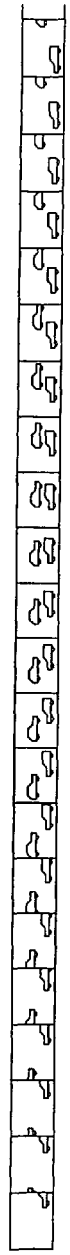
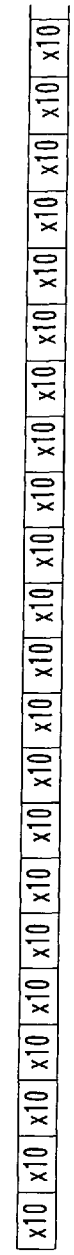
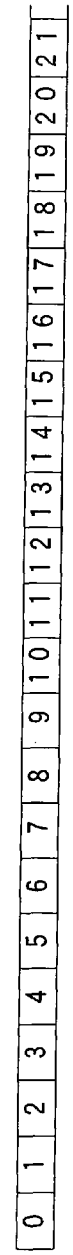
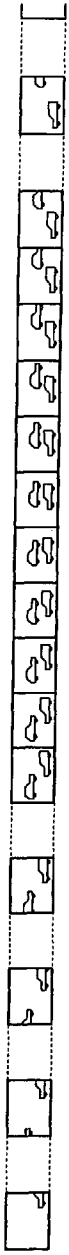
FIG. 15A (DVz)
FIG. 15B (DMz-FRs)
FIG. 15C (DMc-LM)
FIG. 15D (AN)
FIG. 15E (AN)
FIG. 15F (Svz)

FIG. 17A (AN)
FIG. 17B (DMz-FRs)
FIG. 17C (DMc-LM)
FIG. 17D (Svz)
FIG. 17E (Saz)

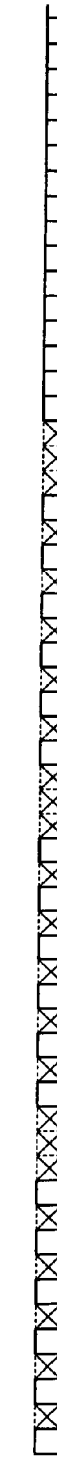
FIG. 18A (AN)
FIG. 18B (DMz-FRs)
FIG. 18C (DMc-LM)
FIG. 18D (Svz)
FIG. 18E (Saz)

DATA PROCESSING METHOD, DATA PROCESSING APPARATUS, AND PROGRAM AND DATA RECORDING MEDIUM THEREFOR

BACKGROUND OF THE INVENTION

1. Field of the Invention

The invention relates to a data processing method, a data processing apparatus, and a program and a data recording medium therefor.

2. Related Art

In conventional broadcasting, content for advertisement such as a commercial film is inserted into programmed content such as dramas, movies, sports so that efficient advertisement may be realize on a viewer who views a content in real time.

On the other hand, in an apparatus for recording and reproducing the content such as video tape recorder, proposed has been a function such that a part of the content for advertisement is detected and automatically skipped when reproducing the recorded content. For example, see Japanese Patent Application Publication No. 2000-115712. The function allows a viewer to view the programmed content without a break by the content for advertisement.

With a progress of the digital technique, a broadband communication network, and drop in a communication charge, it has been realized that main data including at least one of audio digital data for a content and image digital data for a content, for example, content data including at least one of audio data and image data is interactively distributed through the communication network. According to the distribution of the content data through the communication network, it is possible to reproduce the content without a break absorbing a fluctuation (unevenness on an arrival of data) generated within the communication network by storing the distributed content data temporarily in a buffer before reproduction. A progress of the data compression technique and a broadband communication network also allows the content to be distributed with a high image quality.

When reproducing the content thus distributed, storing the content data in the buffer allows all the frame images received from a broadcast station side to be displayed in sequence like broadcasting. This also allows a desired frame image to be selectively reproduced. For example, in a part of the content that a viewer does not want to view, it is possible to reproduce this part according to quick motion reproduction, skipping or the like by frame-skipping or the like.

When the reproduction operation such as quick motion reproduction and skipping is realized at a time of the distribution of content, the content for advertisement such as a commercial film would be subject to the quick motion reproduction or the skipping from the beginning even if the content for advertisement is inserted into the programmed content. This inhibits an advertising effectiveness by the inserted content for advertisement.

It is an object of the present invention to provide a data processing method, a data processing apparatus, and a program and a data recording medium therefor wherein a provider side of the main data allows the reproduction operation of the main data by the reproducer side to be limited.

SUMMARY OF THE INVENTION

According to an aspect of the present invention, a data processing apparatus comprises a combining device for combining main data including at least one of audio data and image data with associated information indicating limitation information for limiting reproduction operation of the main data when reproducing the main data, and a transmitting device for transmitting the main data combined with the associated information.

According to another aspect of the present invention, a data processing method comprises the steps of combining main data including at least one of audio data and image data with associated information indicating limitation information for limiting reproduction operation of the main data when reproducing the main data, and transmitting the main data combined with the associated information.

In this invention, the main data including at least one of audio data and image data is combined with the associated information indicating limitation information for limiting reproduction operation of the main data when reproducing the main data. The main data is then transmitted. A reproducer side that receives such the main data uses the associated information indicating limitation information to perform its reproduction operation. Thus, a provider side of the main data allows the reproduction operation of the main data by the reproducer side to be limited.

According to additional aspect of the present invention, a data processing apparatus comprises a determining device for determining whether or not indication information indicates limitation information for limiting reproduction operation of main data including at least one of audio data and image data, and a combining device for combining the main data with associated information indicating the limitation information when the determining device determines that the indication information indicates the limitation information.

According to further aspect of the present invention, a data processing method comprises the steps of determining whether or not indication information indicates limitation information for limiting reproduction operation of main data including at least one of audio data and image data, and combining the main data with associated information indicating the limitation information when determining that the indication information indicates the limitation information in the determining step.

In this invention, when determining that the indication information indicates the limitation information for limiting reproduction operation of main data including at least one of audio data and image data, the main data is combined with the associated information indicating the limitation information. A reproducer side that receives the combined main data uses the associated information indicating limitation information to perform its reproduction operation. Thus, a provider side of the main data allows a limitation part of the reproduction operation of the main data by the reproducer side to be set.

According to still another aspect of the present invention, a data processing apparatus comprises a determining device for determining whether or not indication information on main data including at least one of audio data and image data indicates limitation information for limiting reproduction operation of the main data, and a correcting device for correcting the associated information on the main data when the determining device determines that the indication information indicates the limitation information.

According to still additional aspect of the present invention, a data processing method comprises the steps of determining whether or not indication information on main data including at least one of audio data and image data indicates limitation information for limiting reproduction operation of the main data, and correcting associated information on the main data when it is determined in the determining step that the indication information indicates the limitation information.

In this invention, when determining that the indication information indicates the limitation information for limiting reproduction operation of main data including at least one of audio data and image data, the associated information on the main data is corrected. A reproducer side receives and uses the corrected associated information to perform its correction operation. Thus, a provider side of the main data allows a limitation part of the reproduction operation of the main data by the reproducer side to be correctly combined with the main data.

According to still further aspect of the present invention, a data processing apparatus comprises an editing device for editing main data including at least one of audio data and image data, and a combining device for combining the main data edited in the editing device with associated information indicating limitation information for limiting reproduction operation of the main data when reproducing the main data.

According to still another aspect of the present invention, a data processing method comprises the steps of editing main data including at least one of audio data and image data, and combining the main data edited in the editing step with associated information indicating limitation information for limiting reproduction operation of the main data when reproducing the main data.

In this invention, the main data including at least one of audio data and image data is edited. The main data thus edited is then combined with the associated information indicating limitation information for limiting reproduction operation of the main data when reproducing the main data. Thus, a provider side of the main data allows the reproduction operation of the main data to be limited according to the content of the edited audio data and/or image data.

According to still additional aspect of the present invention, a data processing apparatus comprises a determining device for determining whether or not main data including at least one of audio data and image data is combined with associated information indicating limitation information for limiting reproduction operation of the main data, and a reproducing device for reproducing the main data based on the limitation information when the determining device determines that the main data is combined with the associated information.

According to still further aspect of the present invention, a data processing method comprises the steps of determining whether or not main data including at least one of audio data and image data is combined with associated information indicating limitation information for limiting reproduction operation of the main data, and reproducing the main data based on the limitation information when determining that the main data is combined with the associated information in the determining step.

In this invention, it is determined whether or not main data including at least one of audio data and image data is combined with associated information indicating limitation information for limiting reproduction operation of the main data. When determining that the main data is combined with the associated information, a reproducing device reproduces the main data based on the limitation information. Thus, a provider side of the main data allows the limitation of reproduction operation of the main data set by itself to be correctly done in a reproducer side of the main data.

A program comprising each of the above data processing methods allows a computer to performs each of them. A data recording medium records data that combines main data including at least one of audio data and image data with associated information indicating limitation information for limiting reproduction operation of the main data.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 12A through 12H are illustrations showing a reproduction operation of the image (part 1);

FIGS. 13A through 13F are illustrations showing a reproduction operation of the image (part 2);

FIGS. 14A through 14G are illustrations showing a reproduction operation of the image (part 3);

FIGS. 15A through 15F are illustrations showing a reproduction operation of the image (part 4);

FIGS. 17A through 17E are illustrations showing a reproduction operation of the audio (part 1); and FIGS. 18A through 18E are illustrations showing a reproduction operation of the audio (part 2).

DETAILED DESCRIPTION OF PREFERRED EMBODIMENTS

Figure 1:
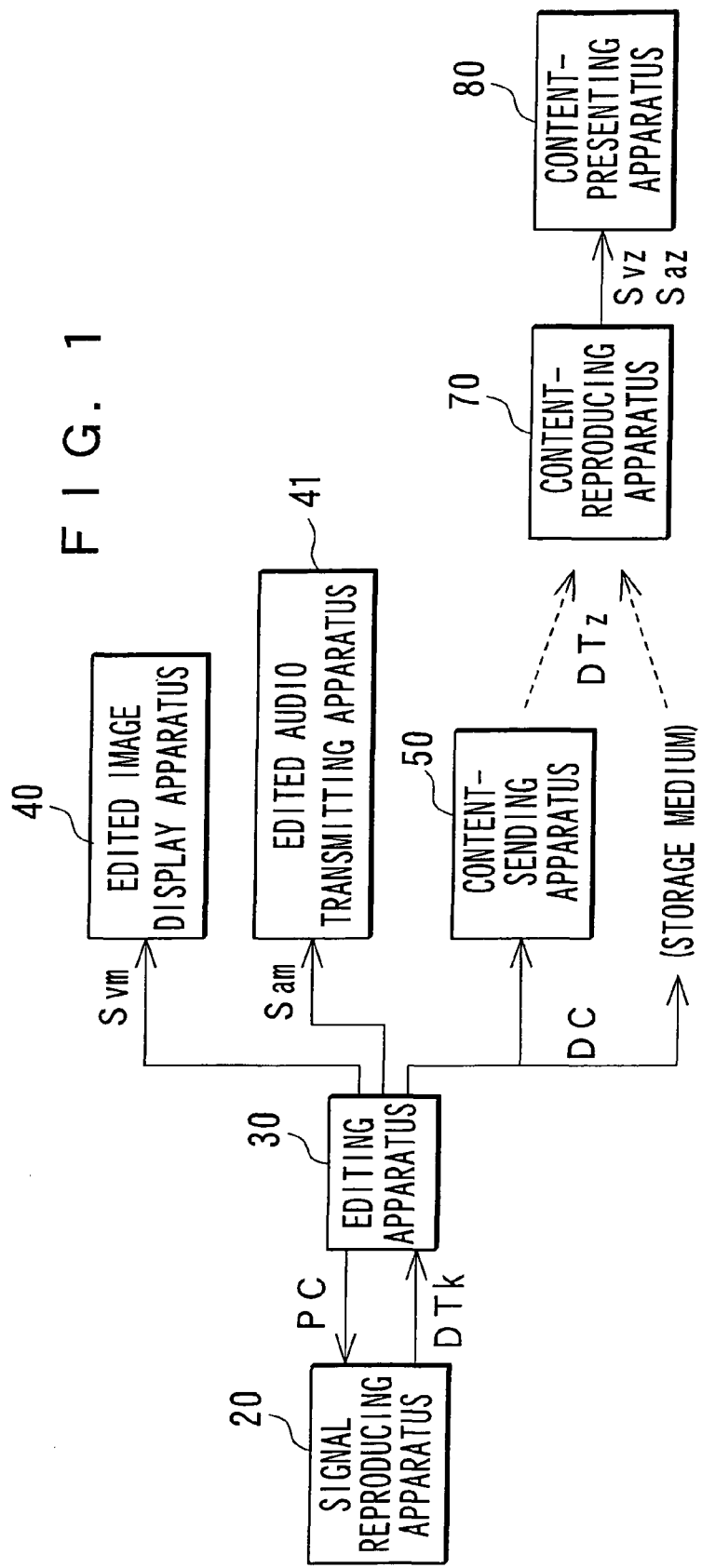
FIG. 1 is a block diagram for illustrating a whole configuration of content-providing system.

Hereinafter, preferred embodiments of the present invention will be described. FIG. 1 shows a content-providing system for generating a content containing at least one of audio and image and distributing the content through broadcasting, delivery or in the form of recording medium so as to allow the content to be visible and audible.

In FIG. 1, a signal reproducing apparatus 20 receives a reproduction-indicating signal PC from an editing apparatus 30 and performs reproduction from a recording medium at a speed based on the reproduction-indicating signal PC so as to generate reproduction data DTk of audio and image with low noises. The signal reproducing apparatus 20 supplies the reproduction data DTk thus generated to the editing apparatus 30.

The editing apparatus 30 supplies the reproduction-indicating signal PC to the signal reproducing apparatus 20 and performed edition using the reproduction data DTk received from the signal reproducing apparatus 20. The reproduction data DTk is data of a set flame rate, which is a speed indicated by the reproduction-indicating signal PC. Further, the editing apparatus 30 generates associated information including flame rate information based on the reproduction-indicating signal PC and combines the associated information with the reproduction data DTk, and edits the resultant data so as to produce content data DC for broadcasting and distribution.

In the combination referred to herein, it is sufficient that data and associated information including frame rate information about this data are combined with each other. For example, even if the data and the associated information containing frame rate information about this data are recorded in different recording mediums or are communicated through different communication paths, these can be corresponded to each other later when including a corresponding frame number in the associated information. In the embodiments, such a case is also included as a combination state.

The editing apparatus 30 generates an image signal Svm related to the edition and supplies it to an edited image display apparatus 40, thereby allowing a user to conform the edition process and edition results of the image according to the displayed image in the edited image display apparatus 40. Similarly, the editing apparatus 30 generates an audio signal Sam related to the edition and supplies it to an edited audio transmitting apparatus 41, thereby allowing a user to conform the edition process and edition results of the audio according to the audio transmitted from the edited audio transmitting apparatus 41.

A content-sending apparatus 50 stores content data DC received from the editing apparatus 30. Further, when receiving a request for content data from a content-reproducing apparatus 70, the content-sending apparatus 50 adjusts the frame rate (hereinafter, referred to as "an transmission frame rate") employed at the time of transmitting the content data in accordance with a bandwidth of a communication path 60. Then, the content-sending apparatus 50 generates sending data DTz based on the content data obtained after the adjustment of transmission frame rate, and supplies the resultant sending data DTz to the content-reproducing apparatus 70 via a wired or wireless communication path 60.

The content-reproducing apparatus 70 generates an audio signal Saz and an image signal Svz for a content based on the sending data DTz received via a communication path, and supplies them to a content-presenting apparatus 80. The content-reproducing apparatus 70 also controls an operation of reproducing the content based on associated information. The content-presenting apparatus 80 presents the content by displaying an image based on the image signal Svz or transmitting the audio based on the audio signal Saz.

Figure 2:
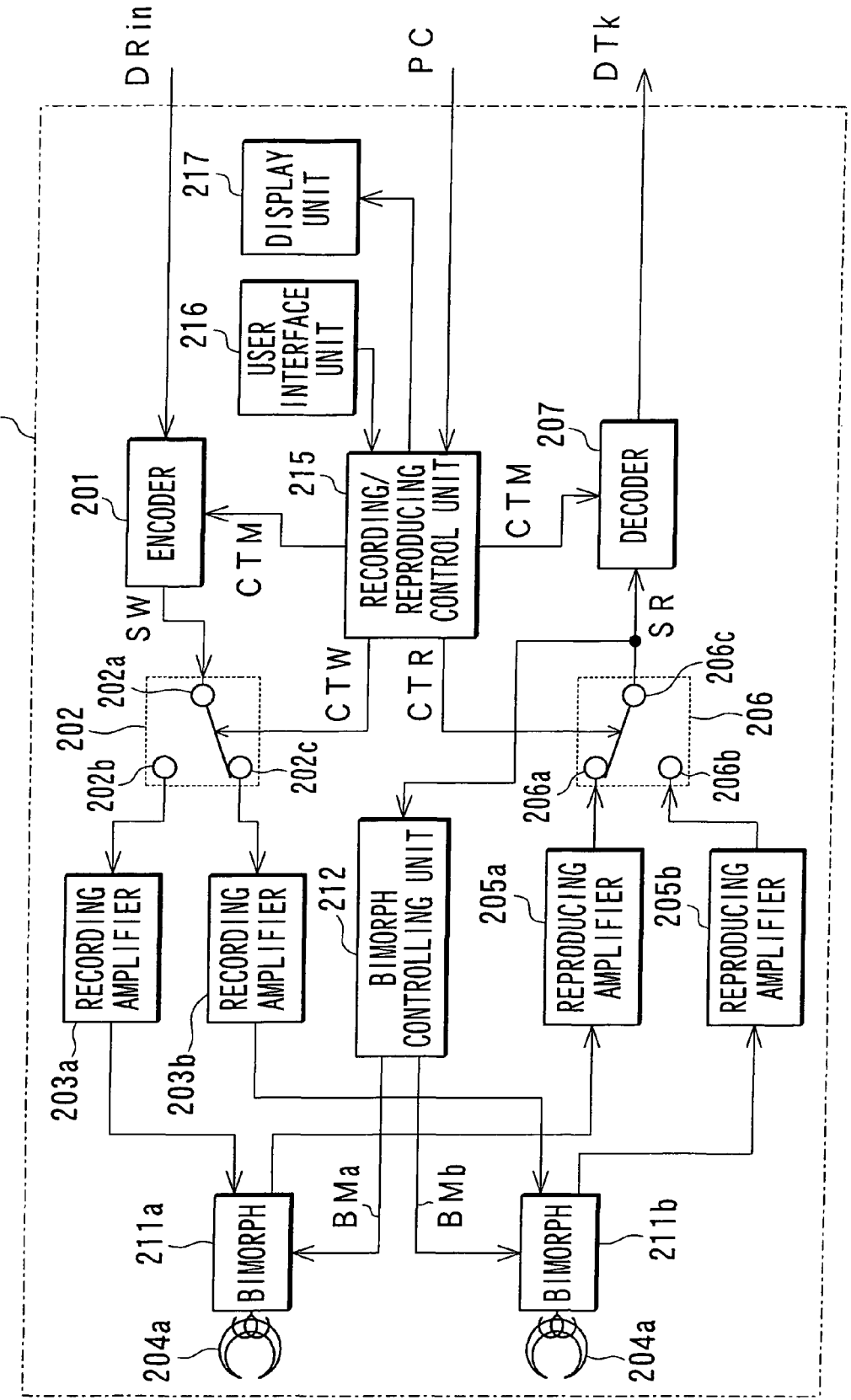
FIG. 2 is a block diagram showing a configuration of video tape recorder.

FIG. 2 shows a configuration of a signal reproducing apparatus 20 for reproducing material data to be used for producing content data from a recording medium in which the material data is recorded, at a reproduction speed corresponding to a reproduction-indicating signal PC. For example, FIG. 2 shows a configuration of a video tape recorder in Dynamic tracking (trade name of Sony) system which is capable of reproduction at a reproduction speed corresponding to the reproduction-indicating signal PC so as to provide reproduction data DTk of image with a low noise.

Data DRin for received audio and/or image is supplied to an encoder 201. Using the received data DRin, the encoder 201 performs production of error correction code, shuffling of data, multiplexing, channel encoding and the like, based on an operation control signal CTM received from a recording/reproducing control unit 215, which will be described later, so as to produce a record signal SW. Then, the encoder 201 supplies thus-produced record signal SW to a switch 202.

The switch 202 receives a switching control signal CTW from the recording/reproducing control unit 215. An operation of a switch 202 is controlled based on this switching control signal CTW, and the record signal SW is supplied to a recording amplifier 203a or a recording amplifier 203b.

The record amplifier 203b amplifies the supplied record signal SW and supplies the amplified record signal SW to a magnetic head 204a. The record amplifier 203b amplifies the supplied record signal SW and supplies the amplified record signal SW to a magnetic head 204b. thus, supplying the amplified record signals SW to the magnetic heads 204a, 204b provided on a rotating drum (not shown) allows audio and/or image to be recorded in a magnetic tape (not shown).

The magnetic heads 204a, 204b respectively read a signal recorded in the magnetic tape. The signal obtained from the magnetic head 204a is supplied to a reproducing amplifier 205a. The signal obtained from the magnetic head 204b is supplied to a reproducing amplifier 205b.

The magnetic heads 204a, 204b have a phase difference at 180 degrees with respect to a direction of rotation, and are attached to a rotating drum via bimorphs 211a, 211b, which are electromechanical converters. The bimorphs 211a, 211b respectively receive driving voltages BMa, BMb in a form of saw teeth, for example, from a bimorph controlling unit 212, and displace each of the magnetic heads 204a, 204b in a direction perpendicular to the direction of rotation thereof based on each of the driving voltages BMa, BMb.

The reproduction amplifier 205a amplifies a signal received from the magnetic head 204a and supplies the amplified signal to a terminal 206a of a switch 206. Further, the reproduction amplifier 205b amplifies a signal received from the magnetic head 204b and supplies the amplified signal to a terminal 206b of the switch 206. A terminal 206c of the switch 206 is connected to a decoder 207.

The switch 206 receives a switch control signal CTR from the recording/reproducing control unit 215. Based on the switch control signal CTR, an operation of the switch 206 is controlled to select signals outputted from the reproduction amplifiers 205a, 205b and supply the selected one to the decoder 207 as reproduction signal SR. The reproduction signal SR is also supplied to the bimorph controlling unit 212. The decoder 207 performs decoding of the reproduction signal SR, separation of data, deshuffling, error correction and the like based on the operation control signal CTM received from the recording/reproducing control unit 215 so as to generate and transmit the reproduction data DTk for audio and/or image. The reproduction data DTk contains information of time code or the like.

Based on the reproduction signals SR, the bimorph controlling unit 212 determines whether or not each of the magnetic heads 204a, 204b is correctly tracing the track on each of their magnetic tapes, and produces driving voltages BMa, BMb in such a manner that each of the magnetic heads 204a, 204b correctly traces the tracks. The bimorph controlling unit 212 supplies thus-produced driving voltages BMa, BMb to the bimorphs 211a, 211b, respectively. Due to this arrangement, even if the reproduction speed is variable, a dynamic tracking operation capable of correctly tracing the track on the magnetic tape is performed, thereby producing an excellent image reproduced at various speeds with low noises.

A user interface unit 216 is connected to the recording/reproducing control unit 215. Based on an operation signal PSv received from the user interface unit 216 or an operation signal PSw received from an external apparatus such as the editing apparatus 30, the recording/reproducing control unit 215 produces switch control signals CTW, CTR and an operation control signal CTM for controlling operations of the encoder 201 and decoder 207. The recording/reproducing control unit 215 also controls drives of the magnetic tape and rotating head. The recording/reproducing control unit 215 also controls drives of the magnetic tape and rotating head based on the reproduction-indicating signal PC received from the editing apparatus 30. The recording/reproducing control unit 215 produces reproduction data DTk with low noise at a set frame rate FRs, which is a speed indicated by the reproduction-indicating signal PC, and supplies it to the editing apparatus 30. The recording/reproducing control unit 215 allows a display unit 217 to display information about operation states and recording/reproducing operations.

FIG. 2 shows a configuration of a video tape recorder in a Dynamic tracking system as a signal reproducing apparatus 20. Alternatively, the signal reproducing apparatus 20 may be a signal reproducing apparatus which uses a disc-shaped record medium utilizing light or magnet or a semiconductor memory and the like, as far as it is capable of providing an image reproduced at various speeds with low noises.

Figure 3:
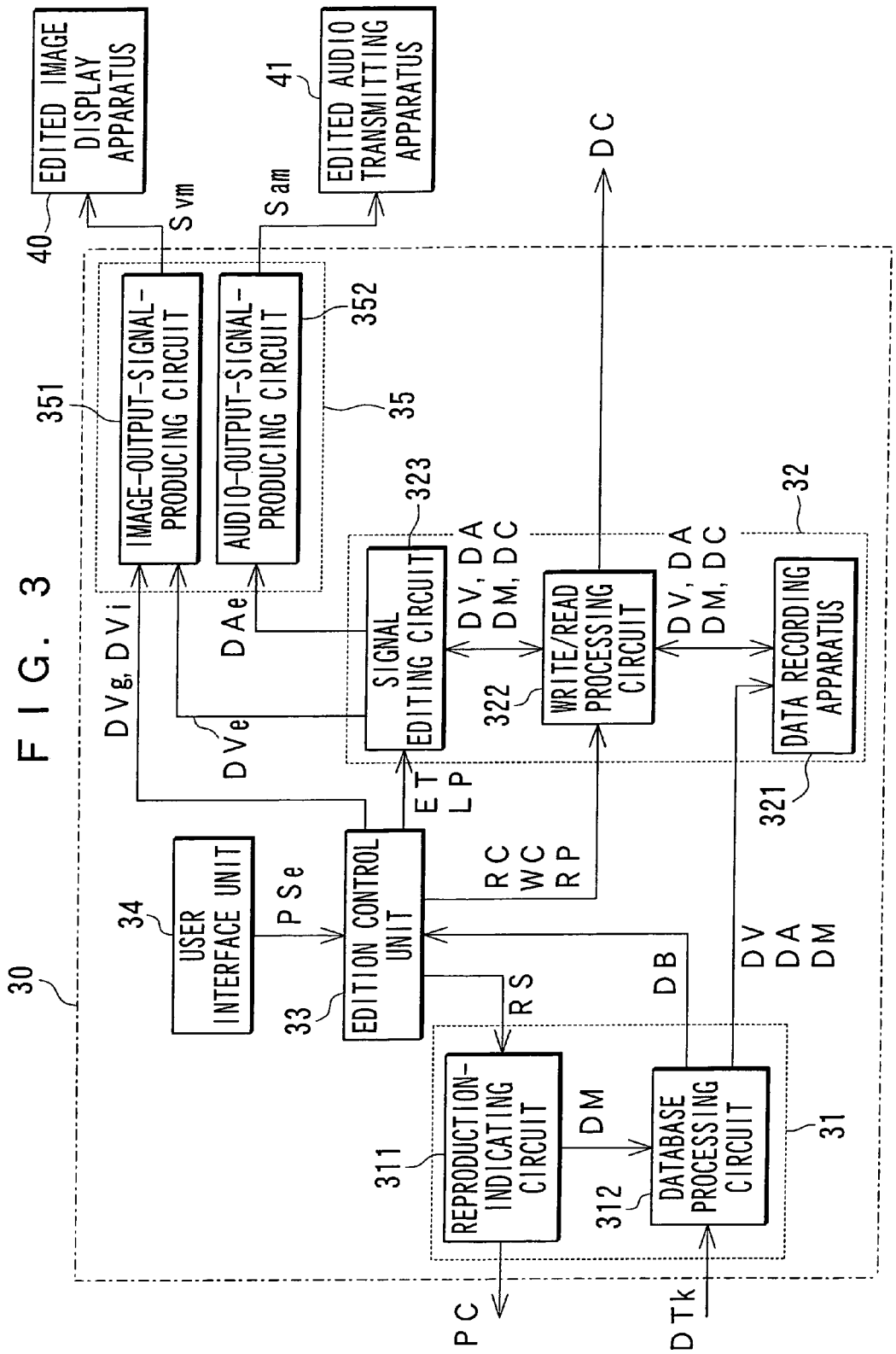
FIG. 3 is a block diagram showing a configuration of an imaging apparatus.

Next, the editing apparatus 30 will be described. FIG. 3 shows a configuration of the editing apparatus 30. A reproduction-indicating circuit 311 in a material-capturing unit 31 generates a reproduction-indicating signal PC based on the control signal RS received from an edition control unit 33, which will be described later. The reproduction-indicating circuit 311 also supplies the control signal PC thus-produced to the signal reproducing apparatus 20 so as to indicate the reproduction speed and reproduction position in the signal reproducing apparatus 20, thereby allowing the signal reproducing apparatus 20 to start reproduction. Further, the reproduction designating circuit 311 also supplies associated information DM containing the frame rate information DM-FRs based on the reproduction-indicating signal PC to a database processing circuit 312. That is, the reproduction designating circuit 311 supplies associated information DM containing the frame rate information DM-FRs with a set frame rate FRs showing a speed indicated by the reproduction-indicating signal PC being set as frame rate information DM-FRs.

When the signal reproducing apparatus 20 supplies the reproduction data DTk of the set frame rate FRs based on the reproduction-indicating signal PC, the database processing circuit 312 receives the reproducing data DTk.

The database processing circuit 312 links the associated information DM with audio data DA and image data DV constituting the reproduction data DTk, and allows a data recording apparatus 321 in an edition processing unit 32 to store the associated information DM. The database processing circuit 312 generates, based on the reproduction data DTk constituting material data stored in the data recording apparatus 321, database information D which makes it easy to confirm the content of material data and supplies the resultant database information DB to an edition control unit 33. For example, the database information DB includes information which permits identification of details of material data (thumbnail, for example), a set frame rate FRs, information about recording location in the data store unit 321 and the like. It is also possible to constitute the database information DB also by use of information indicating time length which has been spent for reproduction based on the reproduction-indicating signal PC and time code information of reproduction data DTk and the like. When the reproduction data DTk contains various kinds of information such as time code and the like and these kinds of information are contained in the associated information DM, the database processing circuit 312 can utilize the information contained in the reproduction data DTk during or after the edition.

The edition control unit 33 produces image data DVg for permitting an edition in a graphical user interface (GUI) environment and image data DVi for displaying content of database information, and supplies the image data DVg, DVi thus-produced to an image-output-signal-producing circuit 351. The image-output-signal-producing circuit 351 produces an image signal Svm based on the image data DVg, DVi supplied thereto and outputs the image signal Svm thus-produced to an edited image display apparatus 40. By supplying the image signal Svm to the edited image display apparatus 40 as described above, the edited image display apparatus 40 displays what kind of material data is stored and the like on a screen thereof.

The edition control unit 33 controls post-production processing. Specifically, when the user interface unit 34 connected to the edition control unit 33 supplies an operation signal PSe which utilizes a display in a GUI environment and the operation signal PSe indicates to select either one of material data, the edition control unit 33 generates a read control signal RC which corresponds to this operation signal PSe and supplies it to a write/read processing circuit 322 in the edition processing unit 32. When the operation signal PSe relates to an editing operation such as processing or combination of the read material data, the edition control unit 33 produces an edition control signal ET which corresponds to the operation signal PSe and supplies it to a signal editing circuit 323 in the edition processing unit 32. When the edition of the material data is finished and content data is completed, and the operation signal PSe indicates an operation for recording the content data in a data recording apparatus 321, the edition control unit 33 produces a write control signal WC which corresponds to the operation signal PSe and supplies it to the write/read processing circuit 322. When the operation signal PSe indicates an output of the content data, the edition control unit 33 produces an output control signal RP which corresponds to the operation signal PSe and supplies it to the write/read processing circuit 322. When the operation signal PSe specifies a reproduction speed range of the content data, the edition control unit 33 produces a speed range setting signal LP which corresponds to the operation signal PSe and supplies it to a signal editing circuit 323.

The write/read processing circuit 322 read required material data out of the data recording apparatus 321 based on the read control signal RC, and supplies it to the signal editing circuit 323. Further, the write/read processing circuit 322 allows the data recording apparatus 321 to store the completed content data DC based on the write control signal WC. Further, the write/read processing circuit 322 reads the required content data DC out of the data recording apparatus 321 based on the output control signal RP and transmits it.

The signal editing circuit 323 performs edition processing such as processing, combination, and deletion of audio and image based on the edition control signal ET, using the audio data DA and/or the image data DV contained in the material data read out of the data recording apparatus 321. In this edition processing, the content data is processed or linked without lowering the frame rate of the audio data DA and the mage data DV that are materials, and content data is generated without lowering the density of images on a time axis. Herein, the signal editing circuit 323 supplies the image data DVe before, during, or after edition to the image-output-signal-producing circuit 351, and supplies the audio data DAe before, during, or after edition to the audio-output-signal-producing circuit 352.

The signal editing circuit 323 has a determination function, a correction function, and a combination function. The signal editing circuit 323 performs edition processing in accordance with the operation signal PSe from the user interface unit 34. When the frame rate of audio data DA or image data DV is changed or the limitation of reproducing operation is determined, the signal editing circuit 323 also corrects the associated information DM in accordance with the audio data and image data obtained after edition. Further, when the signal editing circuit 323 receives a speed range setting signal LP corresponding to the operation signal PSe which is indication information, the signal editing circuit 323 identifies a speed range information indicating a speed range available for the reproduction of the content data DC as limitation information DMc-LM for limiting the reproducing operation of the content based on the speed range setting signal LP, and includes the limitation information DMc-LM in the associated information DMc.

The speed range available for the reproduction is set in such a manner that a noiseless and natural reproduced image can be obtained by frame-skipping at constant frame intervals or repeating frames. For example, when a multiple of set frame rate FRs relative to a reference frame rate FRr is larger than 1, a speed available for the reproduction can be set by obtaining a divisor other than this multiple 1 and calculating an inverse number of the obtained divisor. Specifically, when the set frame rate FRs is 10 times as much as the reference frame rate, the divisor other than 1 is either one of "2, 5, and 10", and the inverse numbers of this divisor is either one of "1/10, 1/5, and 1/2", respectively. Selecting either one of the inverse numbers of the devisor described above allows a reproduction capable speed of lower than one-time speed to be set. When the speed available for the reproduction is equal to or higher than normal reproduction speed, the interval of frame-skipping for each reproduction speed can be equal to each other by setting the speed available for the reproduction to multiple of natural number. The upper limit of the speed available for the reproduction is set to a reproduction speed such that the details of material data can be easily understood, for example.

When the multiple of the set frame rate FRs relative to the reference frame rate FRr is smaller than 1, the speed available for the reproduction can be set by obtaining an inverse number of this multiple and calculating a divisor of the inverse number other than 1 or a value integer times larger than the inverse number. Specifically, when the set frame rate FRs is (1/6) times the reference frame rate, the divisor of the inverse number other than 1 is either one of "2, 3, and 6", and the value integer times larger than the inverse number is either one of "6, 12, and 18". When the speed available for the reproduction is set to the divisor of the inverse number other than 1 or the value integer times larger than the inverse number, the intervals of frame-skipping or the number of times of repetitions performed at each reproduction speed can be set at constant. Even if the reproduction speed is set to be equal to or lower than (1/FRs)-times speed when the multiple of the set frame rate FRs is smaller than 1, the reproduced image is in a state that frame images are repeated for a specified number of times. Therefore, the lower limit of the speed available for the reproduction may be set to (1/FRs)-times speed, or may be set to one-time speed, which is a normal reproduction speed although including several repetitions.

When receiving the title of content or recommended reproduction speed of the content through the operation signal PSe from the user interface unit 34, the signal editing circuit 323 also combines the information as associated information DMc. When information about time length spend for reproducing content data is obtained as a result of edition processing, this information may also be combined as the associated information DMc.

When receiving the title of content and the like from the user interface unit 34, the signal editing circuit 323 also combines this information as the associated information DMc. Further, when information about time length spend for reproducing content data is obtained as a result of edition processing, this information may also be combined as the associated information DMc.

Further, the signal editing circuit 323 allows the limitation information DMc-LM for limiting reproducing operation of content to include information for achieving a desired reproduction speed with fast-forward reproduction and skip reproduction prohibited or information for setting the display size or resolution of image to a desired value, in order to achieve a desired quality of content representation at a viewer side.

The signal editing circuit 323 uses audio data DA and/or image data DV obtained after edition as main data. When limitation information DMc-LM corresponding to this main data is determined, the signal editing circuit 323 combines the associated information DMc indicating the limitation information DMc-LM with the main data so as to generate the transmission content data DC. As described above, the associated information DMc includes the frame rate information DM-FRs indicating a set frame rate FRs corresponding to this main data.

The write/read processing circuit 322 transmits the transmission content data DC thus-produced. The combination between the main data and the associated information DMc may alternatively be performed in the write/read processing circuit 322.

As described above, the image-output-signal-producing circuit 351 in the edition-output-signal-producing unit 35 produces an image signal Svm based on the image data DVg, DVi received from the edition control unit 33 and supplies it to the edited image display apparatus 40. In this manner, information about material data can be displayed in a GUI environment. Further, the image-output-signal-producing circuit 351 produces an image signal Svm based on the image data DVe received from the signal editing circuit 323. As a result, the user can confirm the image before, during, or after edition on a screen of the edited image display apparatus 40.

The audio-output-signal-producing circuit 352 converts the audio data DAe received from the signal editing circuit 323 into an analog audio signal Sam and sets it to a desired signal level. The audio-output-signal-producing circuit 352 then supplies the resultant audio signal Sam to the edited audio transmitting apparatus 41 made of a speaker, a head receiver, and the like, for example. Thus, the user can confirm the audio before, during, or after edition by audio transmitted from the edited audio transmitting apparatus 41.

As described above, the post-production processing is performed using the associated information DM based on the reproduction data DTk or a reproduction-indicating signal PC so as to produce main data containing at least one of the desired audio and image. Then, the associated information indicating limitation information for limiting reproduction operation at the time of reproduction is combined with the main data so as to complete the transmission content data DC. This content data DC is transmitted from the editing apparatus 30. In the case where the content data DC is supplied to a viewer side, the content data can be supplied to the viewer side by transmitting the content data DC via a communication path, or recording the content data DC into a data recording medium and distributing this data recording medium to the viewer side. For this purpose, the content data DC is transmitted via a communication path or the content data DC is recorded into a data recording medium.

When data is transmitted, the content data DC is supplied from the write/read processing circuit 322 to the content-sending apparatus 50, for example. The content-sending apparatus 50 then supplies the content data DC to the content-reproducing apparatus 70 at a viewer side. When data is recorded, the write/read processing circuit 322 records the content data DC on a disc-shaped recording medium utilizing light or magnet or a data recording medium such as magnetic tape, semiconductor memory and the like. In this case, if menu information about the content data or information for special reproduction, for example, searching operation in a reverse time direction is also recorded on the data recording medium, the desired content data recorded on the data recording medium can be easily reproduced. Further, when the audio and/or image data is encoded to compress the data amount, the content data can be efficiently recorded. Further, by use of a recording medium of which data recorded therein is unchangeable, there is no fear that the associated information is changed by a viewer side, whereby the operation of reproducing the main data can be securely limited in accordance with the limitation information.

Figure 4:
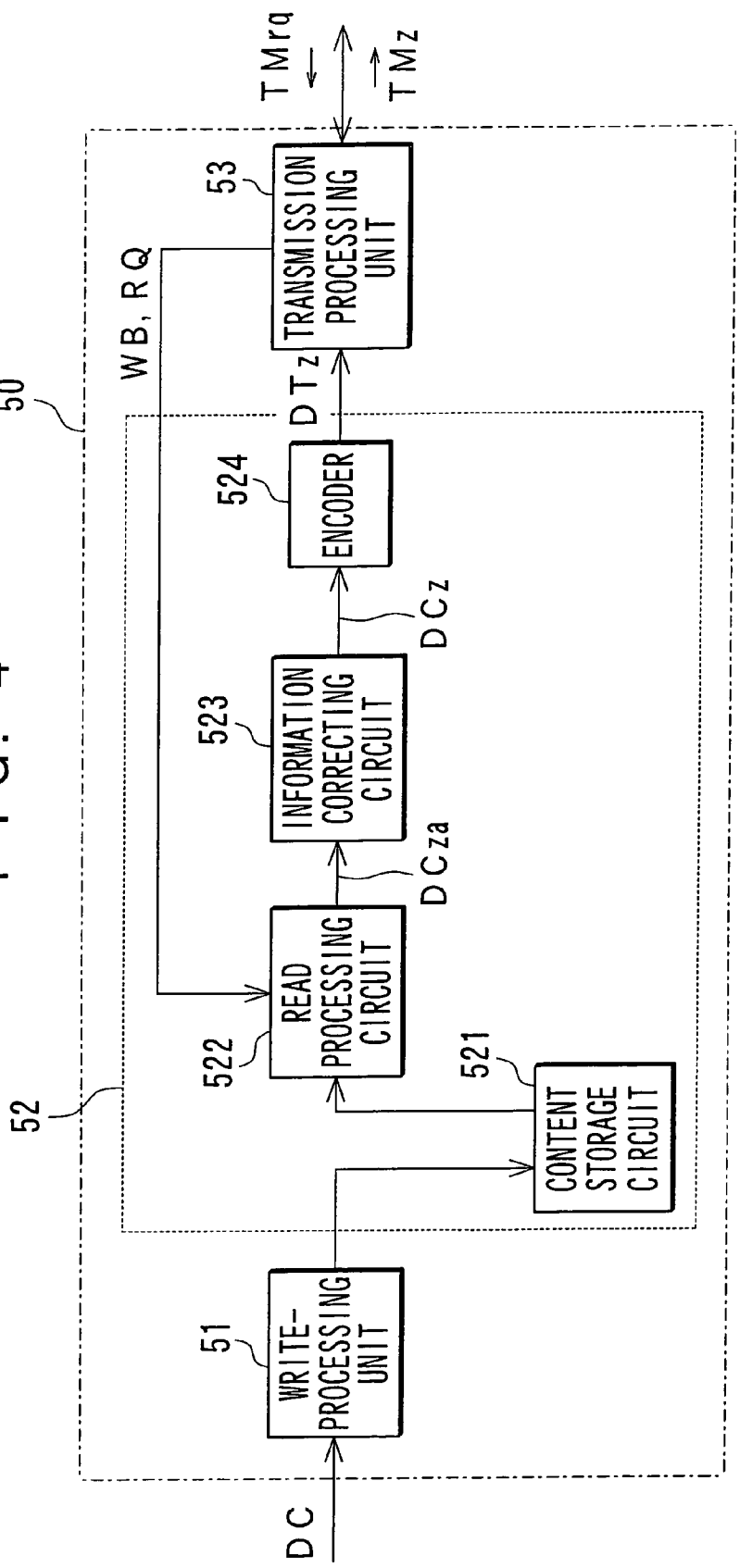
FIG. 4 is a block diagram showing a configuration of a content-sending apparatus.

FIG. 4 shows a configuration of the content-sending apparatus 50. A write-processing unit 51 receives the content data DC for distribution from the editing apparatus 30. The write-processing unit 51 is connected with a content storage circuit 521 in a sending data production unit 52 and allows the content storage circuit 521 to store the content data for distribution thus received. The content data DC is not limited to that supplied from the editing apparatus 30, but audio or image data supplied from an image pickup apparatus or other signal reproducing apparatuses and the like may be used. In this case, in order to limit the reproduction operation of the supplied audio or image data, an user interface unit (not shown) is provided to input instruction information. Then, as is the case of the editing apparatus 30 described above, it is determined whether or not the instruction information indicates limitation information for limiting a reproduction operation of the main data. When determining that the instruction information indicates limitation information, the associated information indicating this limitation information is combined with the main data so as to produce the content data DC.

The sending data production unit 52 produces sending data DTz based on the content data DC. A read processing circuit 522 is connected to the content storage circuit 521 in the sending data production unit 52. The read processing circuit 522 receives from a transmission processing unit 53, which will be described later, bandwidth information WB of a communication path which is employed at the time of transmitting the content data for distribution or a content request signal RQ from a content reproducing apparatus side.

The read processing circuit 522 controls read-out of the required content data to adjust a transmission frame rate based on the bandwidth information WB and the associated information DMc of the required content data DC stored in the content storage circuit 521. The read processing circuit 522 then supplies content data DCza obtained after the transmission frame rate adjustment to an information correcting circuit 523.

The reading processing circuit 522 produces content data DCza with inserting content data for advertisement and the like thereinto during the reading of the required content data. This content data for advertisement and the like may be stored in the content storage circuit 521 beforehand, or alternatively, may be supplied from an external apparatus (not shown) to the read processing circuit 522. In these cases, even if the content data supplied from the editing apparatus 30 does not contain the content for advertisement and the like, it is possible to insert the content for advertisement and the like at the time when the content is sent out to a viewer side. Further, when the inserted content for advertisement is to be presented at desired quality, the associated information containing limitation information DMc-LM for limiting a reproduction operation is combined therewith so as to generate content data of the content for advertisement and the like.

Next, an adjustment of transmission frame rate will be described. The transmission frame rate is adjusted referring to the limitation information DMc-LM. A portion of content in which no limitation information DMc-LM is included in the associated information DMc is a portion in which the transmission frame rate is adjustable. A portion of content in which limitation information DMC-LM is included in the associated information DMc is a portion in which the adjustment of transmission frame rate is restricted so that the content can be presented at desired quality.

In the adjustment of transmission frame rate, if the data amount of one frame is BD bit in the encoding performed by an encoder 524, which will be described later, and the set frame rate FRs indicated by the associated information DMc is n times (n is a positive value) larger than a reference frame rate FRr, the data amount BT to be transmitted in a unit time is calculated as "BT=BD×n×FRr+BH". The data amount BH indicates the total header information to be added when the content data is transmitted in the form of packet.

When the bandwidth BA indicated by the bandwidth information WB as a transmissible data amount is not smaller than the data amount BT, it is determined that no adjustment of the transmission frame rate of the content data should be performed. Then, the content data is sequentially read out of the content storage circuit 521 and is supplied to the information correcting circuit 523. When the bandwidth BA is smaller than the data amount BT, an adjustment of the transmission frame rate is performed for the image data of content data so as to reduce the data amount, thereby preventing the produced image due to the delay in transmission of the content data from interruption. For example, a multiple "m" of the set frame rate FRs relative to the reference frame rate FRr is determined from the set frame rate FRs indicated by the frame rate information DMc-FRs contained in the associated information DMc and the reference frame rate FRr. Further, a divisor of the determined multiple "m" is obtained, and the maximum value of the divisor excluding "m" is multiplied with the reference frame rate FRr to obtain a set frame rate after adjustment. Specifically, when "m=10", the maximum value of the divisor is "5". Therefore, the transmission frame rate adjustment is performed in such a manner that "m=5" is achieved. In this transmission frame adjustment, the content data is read out on alternate frames so as to generate content data of frame rate five times larger than that of the reference frame rate FRr. When "m=9", the transmission frame rate adjustment is performed in such a manner that "m=3" is achieved. Then, the content data is read out on every two frames so as to produce content data after the transmission frame rate adjustment. When the data amount BT after the adjustment is larger than the bandwidth BA, the frame rate is further adjusted. As in the manner described above, by determining the output frame rate after the adjustment through use of the maximum value of the divisor excluding "m", the content data after the transmission frame rate adjustment can be easily generated by simply frame-skipping on a frame basis at the time of reading the content data.

After that, when the data amount BT after the adjustment is larger than the bandwidth BA ever when "m=1", the data amount BT can be further reduced by frame-skipping in such a manner that "m=1/k (k is a natural number)". When the value of the bandwidth BA has changed, the frame rate is changed in accordance with the change in the bandwidth BA.

Audio data in the content data is subjected to sample-skipping in accordance with the transmission frame rate adjustment of the image data so as to generate audio data after the transmission frame rate adjustment. For example, when the image data is read out on alternative frames, the audio data is read out on alternative samples. When the image data is read out every two frames, the audio data is read out every two samples so as to generate the audio data after the transmission frame rate adjustment.

When the transmission frame rate is adjusted by the read processing circuit 522, the information correcting circuit 523 corrects the associated information DMza of the content data DCza in such a manner that the associated information DMza corresponds to the transmission frame rate after the adjustment, thereby allowing the transmission frame rate to become the accurately indicated associated information DMza. Further, the information correcting circuit 523 supplies the content data DCz combined with the associated information DMz to the encoder 524. For example, when "m=10" is adjusted to "m=5", the information correcting circuit 523 corrects the set frame rate FRs from "×10" to "×5", and corrects the frame rate information DMc-FRs indicating that the set frame rate FRs is "×10" to the frame rate information DMz-FRs indicating that the set frame rate FRs is "×5" so as to generate the associated information DMz.

The encoder 524 receives and encodes the content data DCz, and also encodes the audio data DAz or the image data DVz into a signal suitable for transmission so as to generate encoded data DZ. For example, the encoder 524 encodes the audio data DAz or the image data DVz into a signal suitable for streaming delivery using an encoding system standardized as a Moving Picture Experts Group (MPEG) 4. The encoder 524 combines the associated information DMz with the encoded data DZ generated in this encoding so as to generate sending data DTz and supplies it to a transmission processing unit 53. As in a manner described above, the encoding makes it possible to efficiently transmit content data. In the case where the associated information DMz containing limitation information DMc-LM is combined with the encoded data, the encoder 524 can reduce the deterioration in image quality at the portion where the transmission frame rate adjustment is limited by setting the data compression rate to a low level in the encoding.

When the content data is required by the transmission signal TMrq received from the content reproducing apparatus 70, the transmission processing unit 53 supplies a content request signal RQ indicating the required content data to the read processing circuit 522. The transmission processing unit 53 generates the bandwidth information WB about the bandwidth of the communication path 60 and supplies it to the read processing circuit 522. Based on the request for the content data, the transmission processing unit 53 transforms the sending data DTz thus received from the encoder 524 into a transmission signal TMz at a predetermined protocol, and supplies it to a content reproducing apparatus 70 which has made the request for the content data through the communication path 60.

For example, the transmission processing unit 53 may be constituted by a network apparatus such as a router, and traffic information available from a management information base (MIB) possessed by this network apparatus can be used as bandwidth information WB. Alternatively, a packet for measurement is transmitted to the content reproducing apparatus 70 and a bandwidth is determined by measuring a response time from the content reproducing apparatus 70. The results of identification may be used as the bandwidth information WB.

The data amount BT may be variable in accordance with the bandwidth BA by not only adjusting the frame rate at a portion in which the transmission frame rate adjustment of the read processing circuit 522 is not limited based on the bandwidth information WB but also by changing the data compression rate based on the bandwidth information WB by the encoder 524. In this case, since the data amount can be further precisely controlled, it becomes possible to further reduce the deterioration in the quality of transmitted audio and image even if the bandwidth BA is narrow. Further, during the frame period in which the set frame rate FRs is at constant, the frame rate after the adjustment is set to a constant value regardless of the bandwidth information WB and the data amount BT can be adjusted by the encoder 524. In this case, it is possible to prevent the content portion which has been set to a desired frame rate by the editing apparatus 30 from being adjusted to a transmission frame rate differing depending on the bandwidth BA. The transmission frame rate adjustment is not exclusively executed in the content-sending apparatus. Alternatively for example, the frame rate or the associated information of the content data can be corrected when the content data DC is transmitted from the editing apparatus 30 mentioned above.

Figure 5:
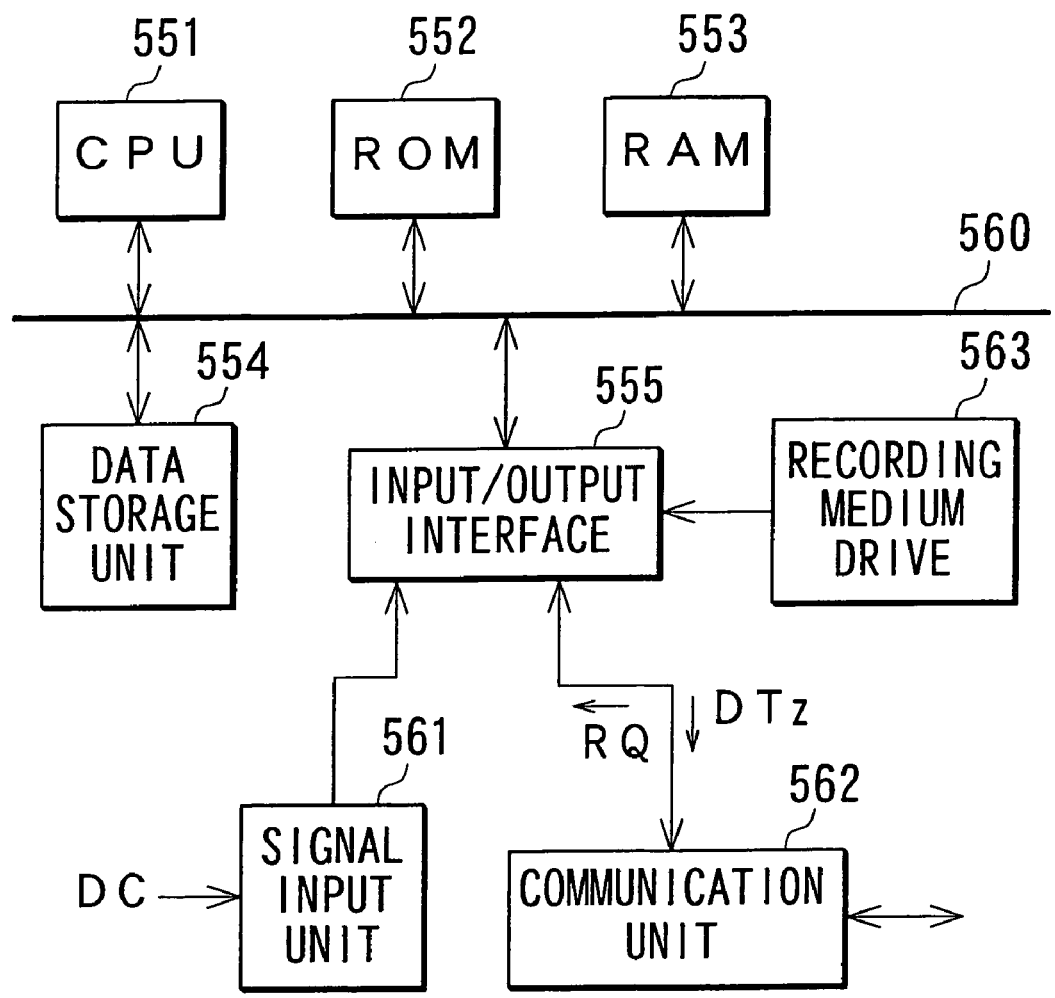
FIG. 5 is an illustration illustrating a configuration of a content-sending system for sending a content by means of software.

By the way, the content-sending processing performed by the content-sending apparatus 50 may alternatively be performed in software using a computer. FIG. 5 shows a configuration employed in the case where the content is sent in the software processing.

As shown in FIG. 5, the computer incorporates a central processing unit (CPU) 551 therein. To the CPU 551, connected are a ROM 552, a RAM 553, a data storage unit 554 constituted by a hard disc drive and the like having a large storage capacity, and an input/output interface 555. To the input/output interface 555, a signal input unit 561, a communication unit 562, and a recording medium drive 563 are connected.

The CPU 551 runs a program stored in the ROM 552, the RAM 553, or the data storage unit 554 so as to send out the content. The CPU 551 allows the content data inputted into the signal input unit 561 to be stored in the data storage unit 554 via the input/output interface 555 and a bus 560. When a content request signal RQ is supplied to the CPU 551 via a communication unit 562, the CPU 551 reads the requested content data from the content data stored in the data storage unit 554, and controls this read-out operation to adjust the transmission frame rate in such a manner that the content data can have a data amount corresponding to the communication path 60. Further, the CPU 551 performs encoding suitable for transmission so as to produce sending data DTz. Thus-produced sending data DTz is transmitted via the communication unit 562.

The program for content-sending processing may be stored in the ROM 552 or the data storage unit 554 beforehand. Alternatively, through recording medium drive 563, the program for content-sending processing may be stored on the recording medium or a program stored on the recording medium may be read and executed. Alternatively, the program may be transmitted or received from or by the communication unit 562 via a wired or wireless transmission path, and the computer may run the received program.

Figure 6:
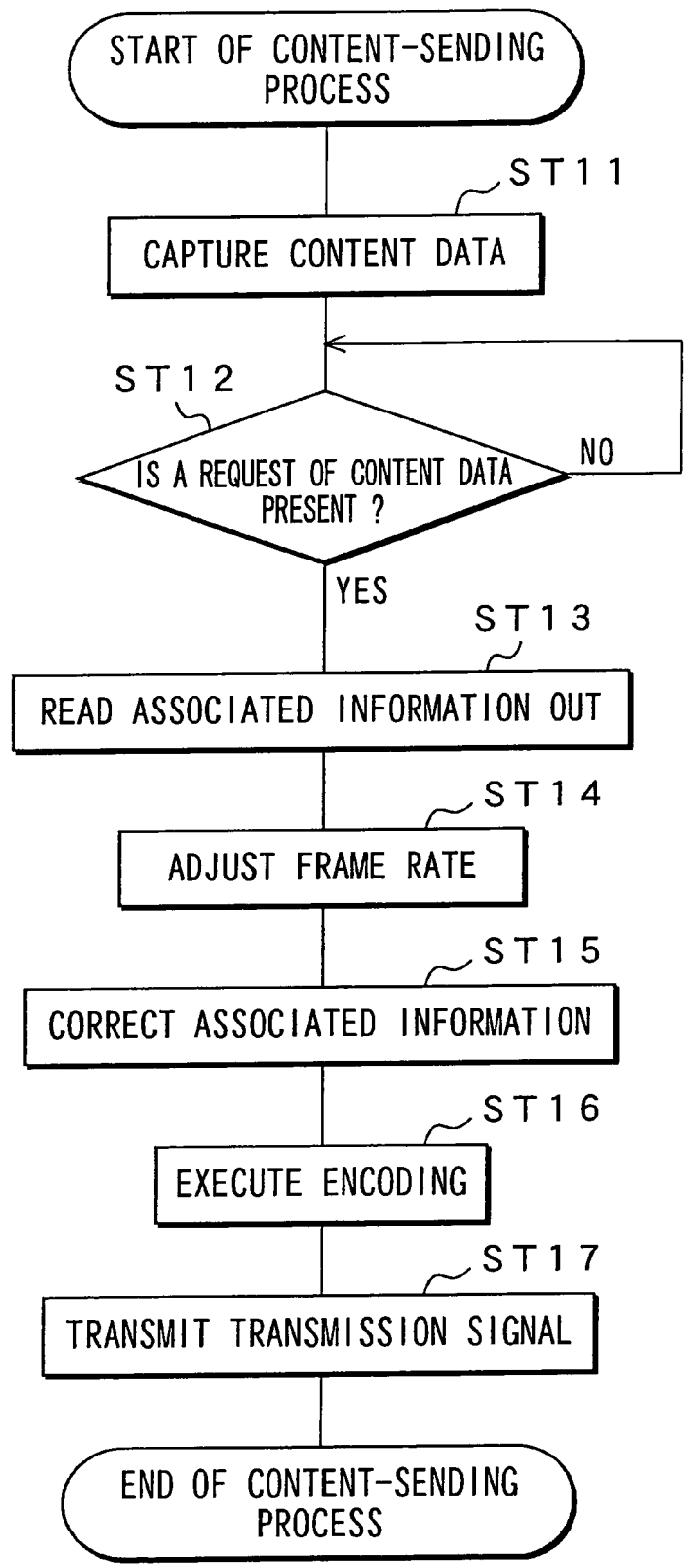
FIG. 6 is a flowchart showing an operation for content-sending process.

FIG. 6 is a flow chart illustrating an operation of sending the content. In Step ST11, the CPU 551 captures the content data DC, and allows the data storage unit 554 to store the content data DC which has been input into a signal input unit 561. The content data is not limited only to the data supplied from the editing apparatus 30. Alternatively, the content data is produced by use of reproduction data outputted from other signal reproducing apparatus or image data outputted from an image pickup apparatus capable of variable speed recording, and the resultant content data may be stored in the data storage unit 554.

In Step ST12, the CPU 551 determines whether or not the content data is required. If no request for the content data is made, the process returns to Step ST12. Contrarily, if a request for the content data is made via the communication unit 562, for example, the process goes to Step ST13.

In Step ST13, the CPU 551 reads the associated information DMc of the required content data. Then, the process goes to Step ST14.

In Step ST14, the CPU 551 detects the bandwidth of the communication path, and adjusts the transmission frame rate with reference to the limitation information based on the detected bandwidth. Further, the CPU 551 reads the content data from the data storage unit 554 so that the content data can have the adjusted frame rate. Then, the process goes to Step ST15.

In Step ST15, the CPU 551 corrects the associated information DMza of the read content data DCza in such a manner that the associated information DMza corresponds to the output frame rate after the adjustment. Then, the process goes to Step ST16.

In Step ST16, the CPU 551 executes encoding which corresponds to the communication path using the content data of which associated information has been corrected, so as to generate encoded data DZ. Further, the CPU 551 generates sending data DTz using the encoded data DZ thus generated and the associated information DMz after the correction. Then, the process goes to Step ST17.

In step ST17, the CPU 551 allows the communication unit 562 to transmit the sending data DTz thus generated toward the identity that has made the request for the content data.

Figure 7:
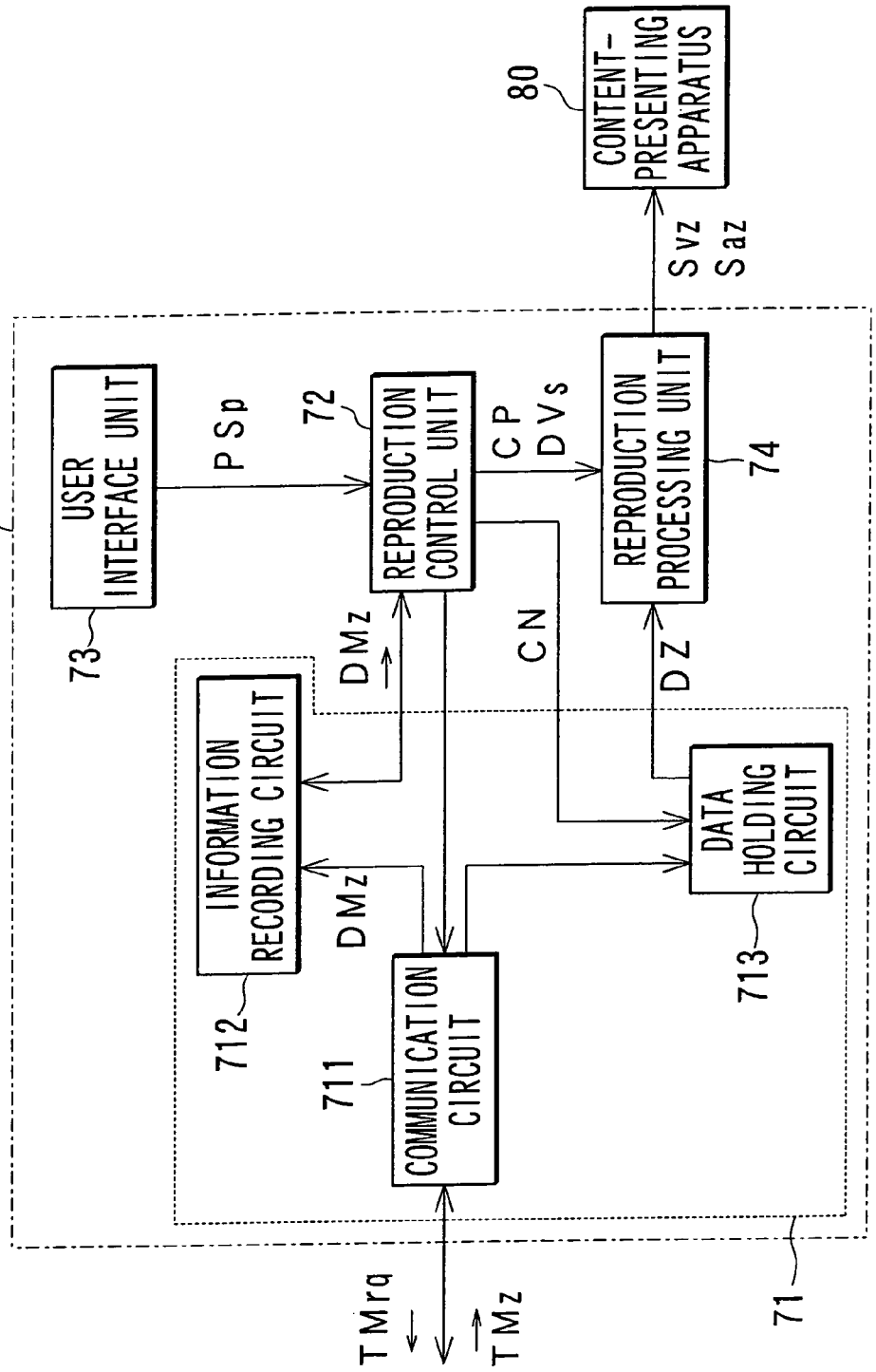
FIG. 7 is a block diagram showing a configuration of a content-reproducing apparatus.

Next, a content reproducing apparatus will be described. FIG. 7 shows a configuration of the content reproducing apparatus 70. A communication circuit 711 in an input unit 71 receives transmission signal TMz from the content-sending apparatus 50. The input unit 71 captures the content data. The communication circuit 711 of the input unit 71 generates sending data DTz from the transmission signal TMz thus received, and also extracts encoded data DZ and associated information DMz from this sending data DTz. Further, the communication circuit 711 supplies the associated information DMz thus-extracted to an information recording circuit 712, and supplies the encoded data DZ to a data holding circuit 713. The communication circuit 711 generates a transmission signal TMrq based on the content request signal RQ supplied from a reproduction control unit 72, which will be described later, and supplies it to the content-sending apparatus 50.

The information recording circuit 712 records the associated information DMz supplied thereto. The data holding circuit 713 stores the encoded data DZ supplied thereto.

A user interface unit 73 is connected to the reproduction control unit 72. When the operation signal PSp supplied from the user interface unit 73 makes a request for content data, the reproduction control unit 72 produces the content request signal RQ based on the operation signal PSp and supplies it to the communication circuit 711. In this manner, the reproduction control unit 72 requires the content-sending apparatus 50 to send the content data.

When the operation signal PSp indicates a reproduction of the content data, the reproduction control unit 72 supplies a read control signal CN to the data holding circuit 713, reads the encoded data DZ of the content of which reproduction has been indicated from the data holding circuit 713, and supplies it to the reproduction processing unit 74. Further, the reproduction control unit 72 reads the associated information DMz corresponding to the read encoded data DZ from the information recording circuit 712. Then, the reproduction control unit 712 generates image data DVs for displaying information contained in the associated information DMz, image data for displaying a speed range available for reproduction based on the limitation information contained in the associated information DMz, and image data for displaying the total time period and the time of the reproduction location, when the associated information DMz contains time information such as time code, indicated by this time information. The reproduction control unit 712 supplies it to a reproduction processing unit 74. In this manner, the speed range available for reproduction, the total time period, and the time of reproduction location are displayed on a screen of the content-presenting apparatus 80 such as a television set or a monitor device. When no associated information DMz contain speed range information, the speed range available for reproduction is set as in the case of the editing apparatus 30 described above. The speed range thus set is displayed on a screen of the content-presenting apparatus 80.

When the operation signal PSp changes the reproduction speed FP of the content, the reproduction control unit 72 generates a presentation control signal CP for controlling an operation of the reproduction processing unit 74 based on the associated information DMz, and supplies it to the reproduction processing unit 74.

When the limitation information DMc-LM is provided in the associated information DMz, the reproduction control unit 72 limits the reproduction operation of the content provided with the limitation information DMc-LM regardless of the instruction made by the operation signal PSp. Here, when the limitation information DMc-LM indicates the details of limitation, for example, the reproduction speed, image size and the like, the reproduction control unit 72 generates a presentation control signal CP in such a manner that the reproduction is executed under the conditions shown by the details of this limitation, and supplies it to the reproduction processing unit 74. Further, when limitation information DMc-LM is not combined with the associated information DMz, the reproduction control unit 72 generates a presentation control signal CP in such a manner that the reproduction is executed under the conditions determined beforehand, and supplies it to the reproduction processing unit 74.

When the associated information DMz indicates a recommended reproduction speed and contains no limitation information DMc-LM, the reproduction control unit 72 generates a presentation control signal CP in such a manner that the reproduction is executed at this recommended reproduction speed if the operation signal PSp does not instruct a reproduction speed. When the associated information DMz indicates the title or time length of the content, the reproduction control unit 72 allows the content-presenting apparatus 80 to display the information on its screen.

The reproduction processing unit 74 for reproducing the content at variable speeds decodes the encoded data DZ supplied from the data holding circuit 713, so as to generate the audio data DAz or the image data DVz of the content. The reproduction processing unit 74 further performs frame-skipping or frame repetition for the audio data DAz or the image data DVz thus generated based on the presentation control signal CP so as to generate an audio signal Saz or an image signal Svz at a reproduction speed FP set by a user or a reproduction frame rate corresponding to the reproduction speed FP equal to the recommended reproduction speed, and supplies it to the content-presenting apparatus 80 so as to present the content. Further, when the reproduction processing unit 74 receives image data DVs for displaying the information contained in the associated information DMz, the reproduction processing unit 74 generates an image signal Svz for making a display based on this image data DVs, for example, for displaying a speed range available for reproduction and the like on a screen of the content-presenting apparatus 80.

Further, the content-reproducing apparatus 70 may use a recording medium in which the content data DC is recorded. In this case, the same data processing as described above can be achieved in the following manner. Associated information and audio and/or image encoded data are separated from the reproduction signal obtained by reproducing the recording medium. Then, thus-obtained associated information is recorded in the information recording circuit 712 and thus-obtained encoded data is recorded in the data holding circuit 713.

Figure 8:
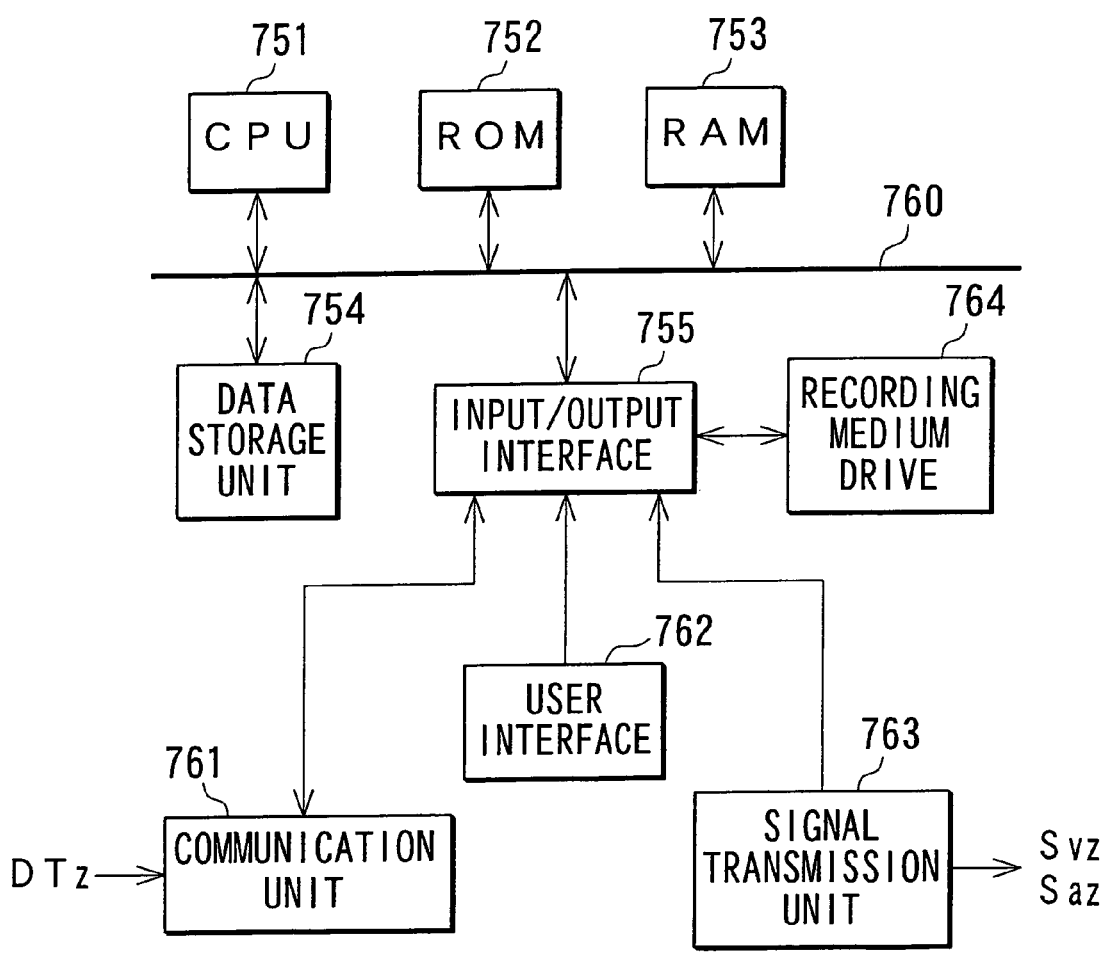
FIG. 8 is an illustration illustrating a configuration of a content-reproducing system for reproducing a content by means of software.

The content reproduction processing in the content-reproducing apparatus 70 described above can be achieved in software processing by use of a computer. FIG. 8 shows a configuration employed in the case where the content is reproduced in the software processing.

As shown in FIG. 8, the computer incorporates a CPU 751 therein. To the CPU 751, a ROM 752, a RAM 753, a data storage unit 754, and an input/output interface 755 are connected via a bus 760. To the input/output interface 755, a communication unit 761, a user interface unit 762, a signal output unit 763, and a recording medium drive 764 are connected.

The CPU 751 runs a program stored in the ROM 752, the RAM 753, or the data storage unit 754, and executes content sending process based on the operation signal PSp supplied from the user interface unit 762. When the communication unit 761 receives sending data DTz, the communication unit 761 extracts encoded data DZ and associated information DMz. The CPU 751 allows the data storage unit 754 to store the encoded data DZ and the associated information DMz thus extracted in the communication unit 761. Further, the CPU 751 reads or decodes the encoded data DZ stored in the data storage unit 754 based on the operation signal PSp supplied from the user interface unit 762, thereby generating the audio data DAz or the image data DVz, and supplying it to a signal output unit 763. The signal output unit 763 generates and transmits an audio signal Saz or an image signal Svz which correspond to the content-presenting apparatus 80, based on the audio data DAz or the image data DVz.

The program for content reproduction process may be stored in the ROM 752 or the data storage unit 754 beforehand. Alternatively, the program for content reproduction process may be recorded in a recording medium or a program recorded in a recording medium may be read and executed by use of a recording medium drive 764. Alternatively, the program may be transmitted or received from or by the communication unit 761 via a wired or wireless communication path, and a computer may execute the received program.

Figure 9:
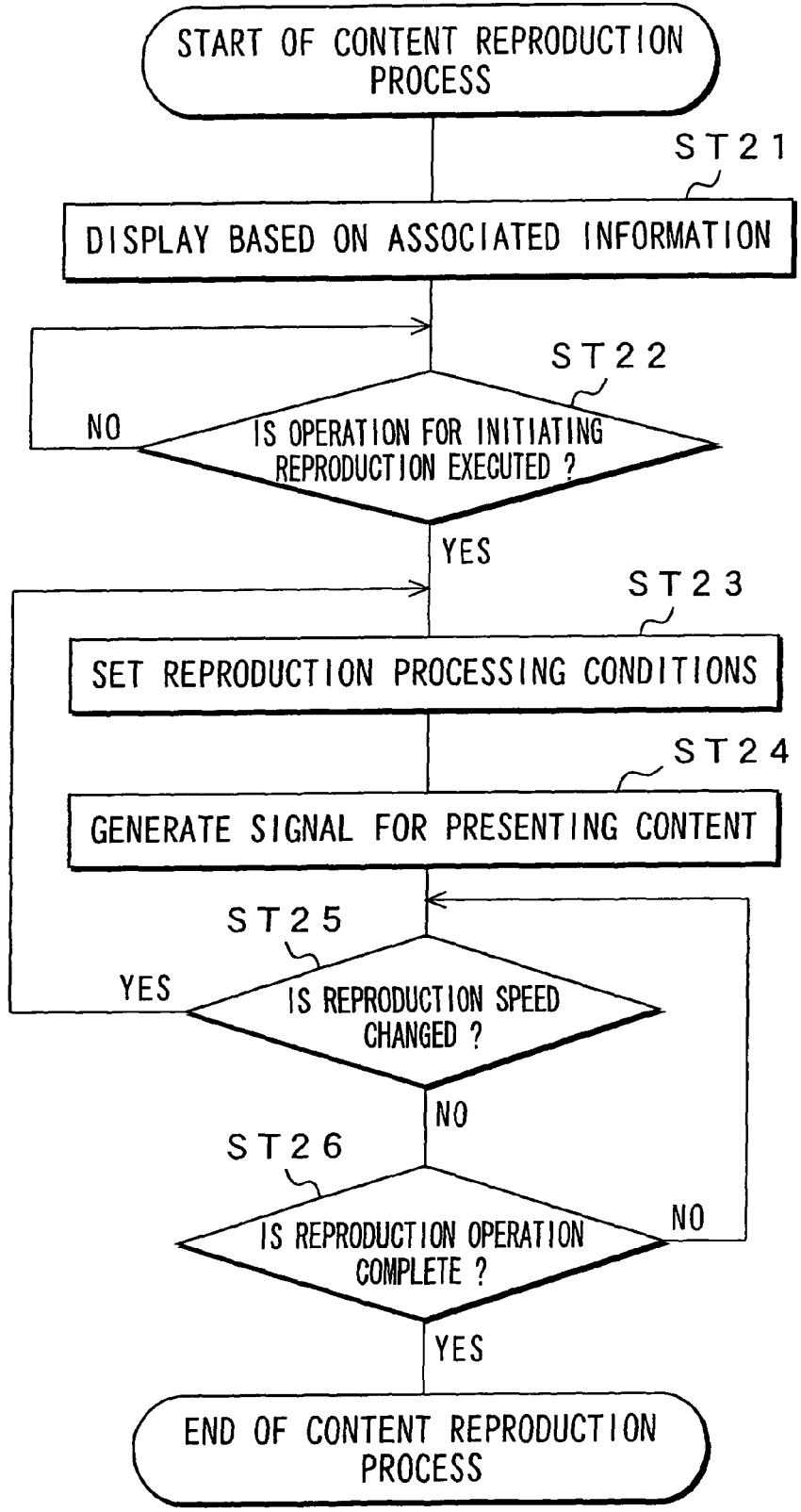
FIG. 9 is a flowchart showing an operation for content-reproducing process.

FIG. 9 is a flowchart for illustrating an operation for content reproduction process. In the case of reproducing content data, the CPU 751 allows the content-presenting apparatus 80 to display an image for constituting a GUI environment. An operation corresponding to this displayed image is executed at the user interface unit 762 so as to carry out input operations.

Figure 10:
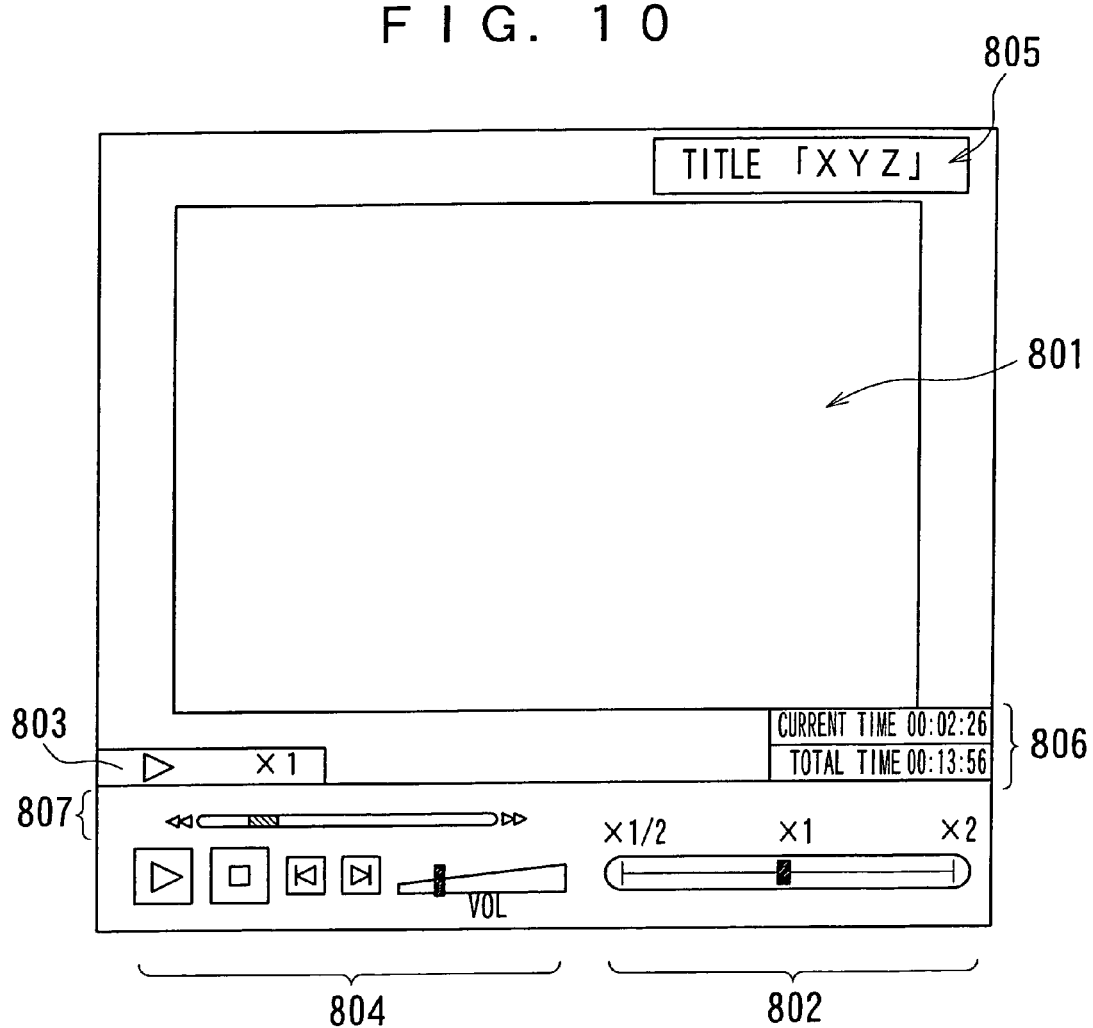
FIG. 10 is an illustration illustrating a representative image of the content-representing apparatus.

FIG. 10 shows an exemplary image constituting a GUI environment displayed on the content-presenting apparatus 80. On the screen of the content-presenting apparatus 80, a viewer window 801 for displaying an image of content, a speed variable console representation 802 which is an interface for changing a reproduction speed FP, a reproduction speed display 803 for displaying a reproduction speed FP, an operation control representation 804 for switching an operation mode, sound volume, and the like, a title display bar 805 for indicating the title of content, a time display 806 for displaying the reproduction time of content or the current time, a reproduction location display bar 807 for displaying the current reproduction location, and the like are provided.

In Step ST21 in FIG. 9, the CPU 751 reads the associated information DMz of content from the data storage unit 754, and allows the signal transmission unit 763 to transmit the audio signal Saz or the image signal Svz produced based on the associated information DMz to the content-presenting apparatus 80 via the input/output interface 755. As a result, the content-presenting apparatus 80 performs display based on the associated information DMz. For example, the title of content or time length of content is displayed on the title display bar 805 or the time display 806. In addition, the speed range available for reproduction is displayed on the speed variable console representation 802.

In Step ST22, the CPU 751 determines whether or not the operation for initiating the reproduction of content is executed based on the operation signal PSp, by use of the operation control representation 804. If an operation for initiating the reproduction is not executed, the process goes back to Step ST22. Contrarily, if the operation for initiating the reproduction of content is executed, the process goes to Step ST23.

In Step ST23, the CPU 751 determines reproduction processing conditions in accordance with the reproduction speed FP and the associated information DMz, that is, determines the interval of data for skipping or the number of times of repeating data performed by use of the audio data DAz or the image data DVz at the time when an audio signal Saz or an image signal Svz is generated from the audio data DAz or the image data DVz obtained by decoding the encoded data DZ. Then, the process goes to Step ST24.

In Step ST24, the CPU 751 reads encoded data DZ from the data storage unit 754 and decodes it so as to produce the audio data DAz or the image data DVz. In addition, the CPU 751 performs data-skipping, repeats data and the like under the reproduction processing conditions determined in Step ST23, so as to generate the audio signal Saz or the image signal Svz at a reproduction frame rate for presenting the content. The CPU 751 supplies thus-produced audio signal Saz or image signal Svz to the content-presenting apparatus 80, so as to allow the content-presenting apparatus 80 to display a reproduced image on a viewer window 801 at a reproduction speed FP indicated by a cursor position (shown by a bold line) on the speed variable console representation 802. Further the CPU 751 allows the reproduction speed display 803 to display the reproduction speed FP at this time, and allows the time display 806 or the reproduction location display bar 807 to display the reproduction time or the reproduction location, respectively. Further, the content-presenting apparatus 80 transmits the reproduced audio at a reproduction speed FP indicated at the cursor position on the speed variable console representation 802.

In Step ST25, the CPU 751 determines whether or not the cursor position on the speed variable console representation 802 has been shifted to change the reproduction speed FP. If the CPU 751 determines that the reproduction speed FP has been changed, the process goes back to Step ST23. Contrarily, if the CPU 751 determines that the reproduction speed FP has not been changed, the process goes to Step ST25.

In Step ST26, the CPU 751 determines whether or not the reproduction operation is complete. If no operation for stopping the reproduction operation is executed, or the reproduction location of the content is still not reached an end location, the process goes back to Step ST25. Contrarily, if an operation for stopping the reproduction operation is executed, or the reproduction location reaches to the end location, the CPU 751 ends a variable speed reproduction operation.

Figure 11:
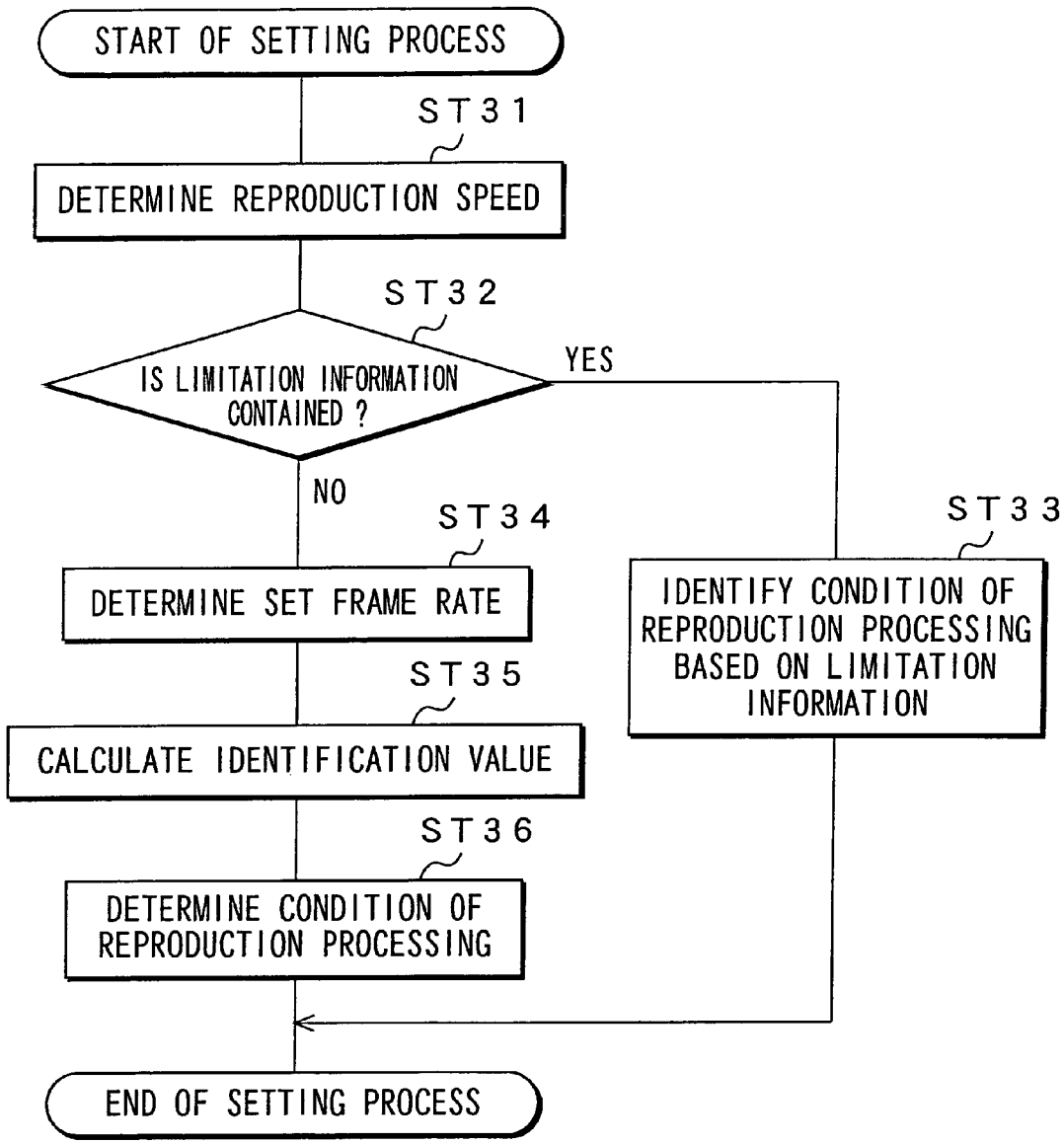
FIG. 11 is a flowchart showing an operation for setting process of reproduction processing condition on an image.

FIG. 11 is a flowchart showing an operation of setting process of the reproduction processing conditions. In Step ST31, the CPU 751 determines the reproduction speed FT based on the cursor location on the speed variable console representation 802, and the process goes to Step ST32. Here, the CPU 751 determines the reproduction speed FP at the time of initiating the reproduction by setting the reference frame rate FRr to one-time speed and setting the initial location of the cursor on the speed variable console representation 802 to a location of one-time speed, for example. When the reproduction speed FP is recommended by the editing apparatus 30, the CPU 751 employs the position of this recommended reproduction speed FP as an initial location of a cursor, and employs the recommended reproduction speed FP as a reproduction speed FP at the time of initiating reproduction. Further, when a user makes an operation to move a cursor position by inputting an operation signal PSp in the user interface unit 762, the CPU 751 sets the reproduction speed FP to a speed corresponding to the cursor position. Although not shown in the drawings, an operation unit for moving the cursor position may be provided on the content-presenting apparatus 80. In this arrangement, it is possible to supply an operation signal from this operation unit to the CPU 751 for setting the reproduction speed.

In Step ST32, the CPU 751 determines whether or not the associated information DMz contains the limitation information DMc-LM. If the associated information DMz contains the limitation information DMc-LM, the process goes to Step ST33. Contrarily, if the associated information DMz contains no limitation information DMc-LM, the process goes to Step ST34.

In Step ST33, the CPU 751 identifies conditions of reproduction processing based on the limitation information DMc-LM. For example, regardless of the speed indicated by the operation signal PSp, the CPU 751 determines to employ a speed, a display size and the like based on the limitation information DMc-LM, or a speed, a display size and the like which are determined beforehand so as to achieve content-presentation at a desired quality.

In Step ST34, the CPU 751 determines the set frame rate FRs and the process goes to Step ST35.

In Step ST35, the CPU 751 multiplies the reproduction speed FP with the set frame rate FRs so as to produce an identification value FD for determining conditions of reproduction processing.

In Step ST36, the CPU 751 determines conditions of reproduction processing based on the identification value FD. In this case, if the identification value FD is equal to or larger than 1 and contains no value equal to or below decimal point, the CPU 751 determines conditions of reproduction processing in such a manner that images are transmitted at frame intervals corresponding to the identification value FE by conducting frame skipping. If the identification value FD is equal to or larger than 1 and contains a value equal to or below decimal point, the CPU 751 determines conditions of reproduction processing in such a manner that images are skipped at frame intervals corresponding to the integer value of the identification value FD from the frames corresponding to the multiple of the set frame rate FRs relative to the reference frame rate FRr to read the images of the reproduction speed. If the identification value FD is smaller than 1, the CPU 751 determines conditions of reproduction processing in such a manner that a one and same image is repeatedly transmitted until the number of frames reaches to the number which corresponds to a desired reproduction speed. As a result that the CPU 751 executes the processing in Step ST24 described above based on thus-determined conditions of reproduction processing, an image of content can be correctly presented at a desired reproduction speed. Further, when limitation information DMc-LM is determined at the content-presented side, the CPU 751 executes reproduction operation based on this limitation information DMc-LM, that is, executes reproduction operation in such a manner that the content is presented at a desired quality.

FIGS. 12A to 12H show operations of image reproduction executed in the case where the identification value FD is equal to or larger than 1 and does not contain a value below decimal point. FIG. 12A shows an image based on image data DVz at the time when the set frame rate FRs is set at a speed 10 times higher than the reference frame rate. FIG. 12B shows frame rate information DMz-FRs showing set frame rate FRs of frame image. FIG. 12C shows limitation information DMc-LM. FIG. 12D shows an absolute frame number AN. The limitation information DMc-LM shown in FIG. 12C limits a reproducing operation when, for example, a flag is used and the flag is at a high level "H". In FIGS. 12A to 12H, and FIGS. 13A to 13F and FIGS. 14A to 14G described later, the reproducing operation is limited at a commercial portion "CM".

When the reproduction speed FP is set at a (⅕)-times speed, the identification value FD becomes "10×(⅕)=2". Therefore, as shown in FIGS. 12E and 12F, the image data DVz is placed on every "FD=2" frame, that is, on alternate frames, and in this state, an image signal Svz at a reproduction frame rate is produced. In this manner, a reproduced image can be displayed on the content-presenting apparatus 80 at (⅕)-times speed. When the limitation information DMc-LM is set to high level "H", a reproducing operation based on the limitation information DMC-LM, for example, a reproduction speed is automatically switched to one-time speed which is set beforehand, and in this state, frame images at a commercial portion is sequentially read out. When the display size and the like have been changed based on the operation signal PSp, the display size is automatically switched to a display size that is set beforehand. As a result of executing the reproduction operation described above, the commercial images can be presented at a quality desired by a content-presented side.

When the limitation information DMc-LM indicates details of limitation as described above, the reproducing operation is executed under the conditions shown by these details of restriction. FIG. 12E shows an absolute frame number AN of a displayed image. FIG. 12F shows a frame image displayed by an image signal Svz.

When the reproduction speed FP is at two-times speed, the identification value FD is calculated as "10×2=20". Therefore, as shown in FIGS. 12G, 12H, an image signal Svz is produced at every "FD=20" frames, that is, by using image data DVz at every 20 frames with 19 frames skipped. In this manner, a reproduced image at double-times speed can be displayed on the content-presenting apparatus 80. When the limitation information DMc-LM is set to high level "H", the reproduction speed is automatically switched to one-time speed, for example, and in this state, frame images on the commercial portion is sequentially read out. As a result, commercial images can be presented at a quality desired by a content-presented side. FIG. 12G shows an absolute frame number AN of a displayed image. FIG. 12H shows a frame image displayed by an image signal Svz.

FIGS. 13A to 13F show operations of reproducing images in the case where the identification value FD is equal to or larger than 1 and contains a value equal to or below decimal point. FIG. 13A shows an image based on image data DVz when the set frame rate FRs is seven times higher than the reference frame rate FRr. FIG. 13B shows frame rate information DMz-FRs. FIG. 13C shows limitation information DMc-LM. FIG. 13D shows an absolute frame number AN.

If the reproduction speed FP is (⅓)-times speed, the identification value FD is calculated as "7×(⅓)=2.33 . . . ". Therefore, as shown in FIGS. 13E and 13F, image data is read out of seven frames corresponding to the multiple of the set frame rate FRs relative to the reference frame rate FRr every two frames, that is, on alternate frames in correspondence with the integer value portion of the identification value FD, so as to transmit image data DVz of three frames. In this manner, a reproduced image at (⅓)-times speed can be obtained. When the limitation information DMc-LM is set to high level "H", the reproduction speed is automatically switched to, for example, one-time speed which is set beforehand, and frame images on a commercial portion is sequentially read out. In this manner, a commercial image can be presented at a quality desired by a content-presented side. FIG. 13E shows an absolute frame number AN of a displayed image. FIG. 13F shows a frame image displayed by the image signal Svz.

FIGS. 14A to 14G show a reproducing operation when the identification value FD is smaller than 1. FIG. 14A shows an image based on the image data DVz when the set frame rate FRs is (¼)-times higher than the reference frame rate FRr. FIG. 14B shows frame rate information DMz-FRs. FIG. 14C shows limitation information DMc-LM. FIG. 14D shows an absolute frame number AN.

If the reproduction speed FP is set to double-times speed, the identification value FD is calculated as "(¼)×2=½". Therefore, as shown in FIGS. 14E to 14G, an image signal Svz is produced at frame number corresponding to the reproduction speed, that is, using image data DVz twice for each frame. In this manner, a reproduced image at double-times speed can be displayed on the content-presenting apparatus 80. When the limitation information DMc-LM is set to high level "H", the reproduction speed is automatically switched to, for example, one-time speed which is set beforehand, and in this state, frame images at the commercial portion is sequentially read out. As a result, commercial images can be presented at a quality desired by a content-presented side. FIG. 14E shows limitation information DMc-LM. FIG. 14F shows an absolute frame number AN of a displayed image. FIG. 14G shows a frame image displayed by the image signal Svz.

In the above description shown in FIGS. 12A to 12H, FIGS. 13A to 13F, and FIGS. 14A to 14G, commercial images and the like are inserted to limit a reproducing operation. It is also possible to limit the reproducing operation of a part of the content. FIGS. 15A to 15F show a case of limiting a variable speed reproducing operation of a scene of a part of the content, of which set frame rate FRs is set to 10 times higher than the reference frame rate FRr. FIG. 15A shows an image based on image data DVz. FIG. 15B shows frame rate information DMz-FRs showing a set frame rate FRs of a frame image. FIG. 15C shows limitation information DMc-LM. FIG. 15D shows an absolute frame number AN.

When the reproduction speed FP is set to (⅕)-times speed, the identification value FD is calculated as "10×(⅕)=2". In this case, as shown in FIGS. 15E and 15F, an image signal Svz is generated using the image data DVz on alternate frames. As a result, a reproduced image at (⅕)-times speed can be displayed on the content-presenting apparatus 80. When the limitation information DMc-LM is set to high level "H", the reproduction speed is automatically switched to ¹⁄₁₀-times speed which is the lowest value within the speed range available for reproduction, and in this state, frame images are reproduced without any frame-skipping. In this manner, it is possible not only to provide the content at a variable reproduction speed but also to limit reproduction speed only at a portion intended by the content-presented side. FIG. 15E shows an absolute frame number AN of the displayed image. FIG. 15F shows a frame image displayed by the image signal Svz at a reproduction frame rate.

Figure 16:
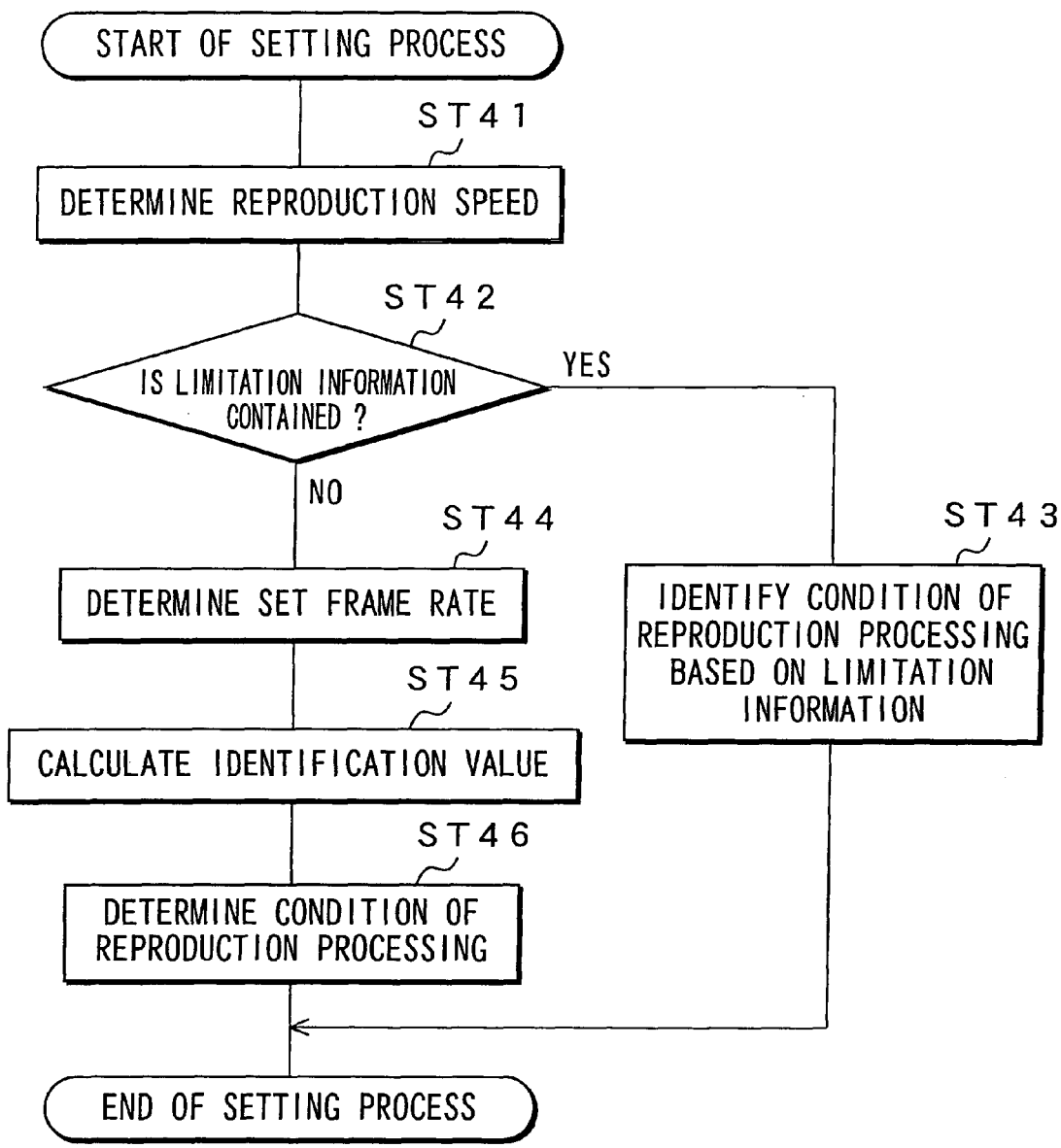
FIG. 16 is a flowchart showing a setting operation of reproduction processing condition against an audio.

Next, audio will be described. FIG. 16 shows a flowchart illustrating an operation of setting process of reproduction processing conditions for audio. In reproducing audio, if audio data DAz is used in unit of frame, continuation of sounds between frames cannot be established and discontinuity in sounds occurs. To avoid such a trouble, reproduction is executed in unit of sample.

In Step ST41, the CPU 751 determines a reproduction speed in the same manner as of Step ST31 and the process goes to Step ST42.

In Step ST42, the CPU 751 determines whether or not the associated information DMz contains limitation information DMc-LM as is conducted in Step ST32. If the associated information DMz contains limitation information DMc-LM, the process goes to Step ST43. Contrarily, if the associated information DMz contains no limitation information DMc-LM, the process goes to Step ST44.

In Step ST43, the CPU 751 identifies conditions of reproduction processing based on the limitation information DMc-LM. For example, the CPU 751 sets the reproduction speed based on the limitation information DMc-LM or sets the reproduction speed which is set beforehand, regardless of the reproduction speed indicated by the operation signal PSp, so as to present the content at a desired quality.

In Step ST44, the CPU 751 determines the set frame rate FRs in the same manner as in Step ST34 and the process goes to Step ST45.

In Step ST45, the CPU 751 multiplies the reproduction speed FP with the set frame rate FRs to obtain an identification value FD for determining conditions of reproduction processing.

In Step ST46, the CPU 751 determines conditions of reproduction processing based on the identification value FD. If the identification value FD is equal to or larger than 1 and does not contains a value equal to or below decimal point, the CPU 751 determines conditions of reproduction processing in such a manner that audio data is skipped at sample intervals corresponding to the identification value FD. If the identification value FD is equal to or larger than 1 and contains a value below decimal point, the CPU 751 determined conditions of reproduction processing in such a manner that audio data is skipped at sample intervals corresponding to the integer value portion of the identification value FD from the frames corresponding to the multiple of the set frame rate FRs relative to the reference frame rate FRr to read audio data of the reproduction speed. If the identification value FD is smaller than 1, the CPU 751 determined conditions of reproduction processing in such a manner that same audio data is repeatedly used until the number of samples of frames reaches to the number which corresponds to a desired reproduction speed. As a result that the CPU 751 executes the processing in Step ST24 described above based on thus-determined reproduction conditions, audio of content can be correctly presented at a desired reproduction speed. Further, when limitation information is determined at the content-presented side, audio of content based on the limitation information can be presented.

FIGS. 17A to 17E show operation of reproducing audio in the case where the identification value FD is equal to or larger than 1 and does not contain a value equal to or below decimal point. FIG. 17A shows an absolute frame number AN. FIG. 17B shows frame rate information DMz-FRs. FIG. 17C shows limitation information DMc-LM.

When the reproduction speed FP is set to (⅕)-times speed, the set frame rate FRs is 10 times higher than the reference frame rate. Therefore, the identification value FD is calculated as "10×(⅕)=2". In this case, an audio signal Saz is generated using the audio data DAz at every "FD=2" samples, that is, on alternate samples. As a result, a reproduced sound at (⅕)-times speed can be transmitted from the content-presenting apparatus 80. When the limitation information DMc-LM is set to high level "H", the reproduction speed is automatically switched to ⅒-times speed that is set beforehand, and in this state, audio data DAz is sequentially read out. In this manner, audio can be presented at a quality desired by the content-presented side. FIG. 17D shows a frame used at the time of producing an image signal Svz. FIG. 17E shows audio data used in the audio signal Saz when the audio data DAz is 14 samples/frame.

FIGS. 18A to 18E show operations of reproducing audio in the case where the identification value FD is equal to or larger than 1 and contains a value equal to or below decimal point. FIG. 18A shows an absolute frame number AN. FIG. 18B shows frame rate information DMz-FRs. FIG. 18C shows limitation information DMc-LM.

When the reproduction speed FP is set to (⅓)-times speed, the set frame rate FRs is seven times higher than the reference frame rate FRr. Therefore, the identification value FD is calculated a "7×(⅓)=2.3 . . . ". When the audio data DAz is 14 samples/frame, the number of samples in one frame at (⅓)-times speed is calculated as "14×3/7=6". In this state, when the audio data DAz is transmitted at every two samples, that is, on alternate samples in correspondence with the integer value portion of the identification value FD and audio data DAz of six samples corresponding to the number of samples in one frame is transmitted, the reproducing operation is shifted to the leading end of the next frame and audio data DAz is transmitted on every alternate samples. By selectively outputting the audio data DAz in the manner described above, a reproduced sound at (⅓)-time speed can be obtained. When the limitation information DMc-LM is set to high level "H", the reproduction speed is automatically switched to, for example, ⅐-times speed that is set beforehand, and in this state, audio data DAz is sequentially read out. It is possible to provide audio at a quality desired by the content-presented side.

If filtering is executed at the time when audio is transmitted based on the audio signal Saz, it is possible to transmit a reproduced audio in an excellent state with a reduced influence by skipping of audio data DAz. FIG. 18D shows a frame used for producing an image signal Svz. FIG. 18E shows audio data used in the audio signal Saz when the audio data DAz is 14 samples/frame.

Further, when an audio signal Saz is generated with audio data DAz being skipped, the audio data may be skipped in such a manner that the audio data to be used for producing the audio signal Saz is at substantially constant intervals, in order to prevent the intervals between audio data DAz from being excessively wide resulting in discontinuity in reproduced audio. For example, when the set frame rate FRs is KA times higher than the reference frame rate FRr and the reproduction speed FP is set to (1/KB) times higher than the reference frame rate FRr, audio data corresponding to KB samples is extracted at substantially constant intervals from the audio data DAz corresponding to continuous KB samples, and an audio signal Saz is produced based on this extracted audio data. Further, when the identification value FD is smaller than 1, each audio data is repeatedly and sequentially used only by the number of times of repeating image frames, although not shown in the drawings. In this manner, audio data DAz at a desired reproduction speed can be produced. In addition, when read-out of the audio data DAz is controlled in accordance with the limitation information DMc-LM, it is possible to present the audio at a quality desired by the content-presented side.

As described above, according to the above embodiment, even if the reproduction is enabled at a variable speed when the content is reproduced, a portion of the content can be presented at quality desired by the content-presented side. For example, by providing limitation information to the content data of commercial, content of the commercial portion can be presented at the quality desired by the content-presented side even during when reproduction is being performed at variable speeds.

The invention has been described in detail with reference to specific embodiments of the invention in the form of the data processing method and the data processing apparatus, mainly. It should be understood that the invention is not be limited to the embodiments and that the invention can be applied equally well to other types of electronic apparatuses. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A data processing apparatus comprising:

a combining device for combining main data including at least one of audio data and image data exhibiting a reference frame rate $FR_r$, with associated information, said associated information including set frame rate data ($FR_s$) representing a reproduction speed for said main data, $FR_s=nFR_r$ (n is an integer or a fraction), said associated information selectively including limitation information for limiting the reproduction speed of said main data to a predetermined range of reproduction speeds having a maximum speed less than a fast reproduction speed selectable by a user, and said associated information further including recommended data representing a recommended reproduction speed at which a reproduction device is set to reproduce a predetermined content of said main data, said recommended reproduction speed being within said predetermined range, said user-selectable reproduction speed being a fast speed produced by skipping selected frames of said main data as a function of $FR_s$, and said user-selectable reproduction speed being a slow speed produced by repeating selected frames of said main data as a function of $FR_s$ said maximum speed of said predetermined range being greater than said reference frame rate $FR_r$, and being set for said predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data; and a transmitting device for transmitting said main data combined with at least said set frame rate data $FR_s$ of said associated information.

2. The data processing apparatus according to claim 1, wherein said limitation information additionally includes information for limiting a display size of an image when reproducing said predetermined content of the main data.

3. The data processing apparatus according to claim 1, wherein said limitation information includes information for maintaining quality of said predetermined content of the main data when reproducing the main data.

4. The data processing apparatus according to claim 1, wherein said transmitting device transmits said main data combined with said associated information through a communication path.

5. The data processing apparatus according to claim 1, wherein said transmitting device allows recording said main data combined with said associated information on recording medium.

6. The data processing apparatus according to claim 1, further comprising an adjuster for adjusting a frame rate of said main data.

7. The data processing apparatus according to claim 6, wherein said adjuster adjusts the frame rate of said main data transmitted from said transmitting device by storing said main data temporarily on a storage medium and controlling read-out of said main data from said storage medium according to a bandwidth of said communication path referring to said limitation information.

8. A data processing method comprising the steps of:
combining main data including at least one of audio data and image data exhibiting a reference frame rate $FR_r$, with associated information, said associated information including set frame rate data ($FR_s$) representing a reproduction speed for said main data, $FR_s=nFR_r$ (n is an integer or a fraction), said associated information selectively including limitation information for limiting the reproduction speed of predetermined content of said main data to a predetermined range of reproduction speed having a maximum speed less than a fast reproduction speed selectable by a user, and said associated information further including recommended data representing a recommended reproduction speed at which a reproduction device is set to reproduce a predetermined content of said main data, said recommended reproduction speed being within said predetermined range, said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being greater than said reference frame rate $FR_r$, and being set for said predetermined content of said main data and not being capable of being overridden by the user-selectable fast reproduction speed, thereby permitting said user to reproduce the predetermined content at a fast speed within said predetermined range and inhibiting said user from exceeding said maximum speed when reproducing the predetermined content of said main data; and transmitting said main data combined with at least said set frame rate data $FR_s$ of said associated information.

9. The data processing method according to claim 8, wherein said limitation information additionally includes information for limiting a display size of an image when reproducing said predetermined content of the main data.

10. The data processing method according to claim 8, wherein said limitation information includes information for maintaining quality of said main data when reproducing said predetermined content of the main data.

11. The data processing method according to claim 8, wherein, in said step of transmitting said main data, said main data combined with said associated information is transmitted through a communication path.

12. The data processing method according to claim 8, wherein, in said step of transmitting said main data, said main data combined with said associated information is recorded on recording medium.

13. The data processing method according to claim 8 further comprising the step of adjusting a frame rate of said main data.

14. The data processing method according to claim 13, wherein, in said step of adjusting said frame rate, the frame rate of said main data transmitted in said step of transmitting said main data is adjusted by storing said main data temporarily on a storage medium and controlling read-out of said main data from said storage medium according to a bandwidth of said communication path referring to said limitation information.

15. A non-transitory computer-readable recording medium having stored thereon a program for allowing a computer to perform a data processing method comprising the steps of:
combining main data including at least one of audio data and image data exhibiting a reference frame rate $FR_r$, with associated information, said associated information including set frame rate data ($FR_s$) representing a reproduction speed for said main data, $FR_s=nFR_r$ (n is an integer or a fraction), said associated information selectively including limitation information for limiting the reproduction speed of said main data to a predetermined range of reproduction speed having a maximum speed less than a fast reproduction speed selectable by a user, and said associated information further including recommended data representing a recommended reproduction speed at which a reproduction device is set to reproduce a predetermined content of said main data, said recommended reproduction speed being within said predetermined range, said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being greater than said reference frame rate $FR_r$, and being set for said predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data; and transmitting said main data combined with at least said set frame rate data $FR_s$ of said associated information.

16. A data processing apparatus comprising:

a determining device for determining whether or not indication information indicates limitation information for limiting reproduction speed of main data to a predetermined range of reproduction speeds having a maximum speed less than a fast reproduction speed selectable by a user, said main data including image data exhibiting a reference frame rate $FR_r$, said indication information including set frame rate data ($FR_s$) representing a reproduction speed for said main data, $FR_s=nFR_r$ (n is an integer or a fraction), said user-selectable reproduction speed being a fast speed produced by skipping selected frames of said main data as a function of $FR_s$, and said user-selectable reproduction speed being a slow speed produced by repeating selected frames of said main data as a function of FRs, said maximum speed of said predetermined range being greater than said reference frame rate $FR_r$, and being set for a predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data, said main data including at least one of audio data and image data; and a combining device for combining said main data with associated information indicating said limitation information when said determining device determines that said indication information indicates said limitation information.

17. The data processing apparatus according to claim 16, wherein said limitation information includes information for limiting a display size of an image when reproducing said predetermined content of the main data.

18. The data processing apparatus according to claim 16, wherein said limitation information includes information for maintaining quality of said main data when reproducing said predetermined content of the main data.

19. A data processing method comprising the steps of:

determining whether or not indication information indicates limitation information for limiting reproduction speed of main data to a predetermined range of reproduction speeds having a maximum speed less than a fast reproduction speed selectable by a user, said main data including image data exhibiting a reference frame rate $FR_r$, said indication information including set frame rate data ($FR_s$) representing a reproduction speed for said main data, $FR_s=nFR_r$ (n is an integer or a fraction), said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being greater than said reference frame rate $FR_r$, and being set for a predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data, said main data including at least one of audio data and image data; and combining said main data with associated information indicating said limitation information when determining that said indication information indicates said limitation information.

20. The data processing method according to claim 19, wherein said limitation information includes information for limiting a display size of an image when reproducing said predetermined content of the main data.

21. The data processing method according to claim 19, wherein said limitation information includes information for maintaining quality of said main data when reproducing said predetermined content of the main data.

22. A non-transitory computer-readable storage medium for storing a program for allowing a computer to perform a data processing method comprising the steps of:

determining whether or not indication information indicates limitation information for limiting reproduction speed of main data to a predetermined range of reproduction speeds having a maximum speed less than a fast reproduction speed selectable by a user, said main data including image data exhibiting a reference frame rate $FR_r$, said indication information including set frame rate data ($FR_s$) representing a reproduction speed for said main data, $FR_s=nFR_r$ (n is an integer or a fraction), said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being greater than said reference frame rate $FR_r$, and being set for a predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data, said main data including at least one of audio data and image data; and combining said main data with associated information indicating said limitation information when determining that said indication information indicates said limitation information.

23. A data processing apparatus comprising:

a determining device for determining whether or not indication information on main data including at least one of audio data and image data exhibiting a reference frame rate $FR_r$ indicates limitation information for limiting reproduction speed of said main data to a predetermined range of reproduction speeds having a maximum speed less than a fast reproduction speed selectable by a user, said indication information including set frame rate data ($FR_s$) representing a reproduction speed for said main data, $FR_s=nFR_r$ (n is an integer or a fraction), said user-selectable reproduction speed being a fast speed produced by skipping selected frames of said main data as a function of $FR_s$, and said user-selectable reproduction speed being a slow speed produced by repeating selected frames of said main data as a function of FRs, said maximum speed of said predetermined range being greater than said reference frame rate $FR_r$, and being set for a predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data; and a correcting device for correcting indication information on said main data when said determining device determines that said indication information indicates said limitation information.

24. The data processing apparatus according to claim 23, wherein said limitation information includes information for limiting a display size of image when reproducing said predetermined content of the main data.

25. The data processing apparatus according to claim 23, wherein said limitation information includes information for maintaining quality of said main data when reproducing said predetermined content of the main data.

26. The data processing apparatus according to claim 23, wherein said indication information is provided from a user.

27. A data processing method comprising the steps of:
determining whether or not indication information on main data including at least one of audio data and image data exhibiting a reference frame rate $FR_r$ indicates limitation information for limiting reproduction speed of said main data to a predetermined range of reproduction speeds having a maximum speed less than a fast reproduction speed selectable by a user, said indication information including set frame rate data ($FR_s$) representing a reproduction speed for said main data, $FR_s=nFR_r$ (n is an integer or a fraction), said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being being greater than said reference frame rate $FR_r$, and set for a predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data; and correcting indication information on said main data when it is determined in said determining step that said indication information indicates said limitation information.

28. The data processing method according to claim 27, wherein said limitation information includes information for limiting a display size of image when reproducing the predetermined content of said main data.

29. The data processing method according to claim 27, wherein said limitation information includes information for maintaining quality of said main data when reproducing the predetermined content of said main data.

30. The data processing method according to claim 27, wherein said indication information is provided from a user.

31. A non-transitory computer-readable storage medium for storing a program for allowing a computer to perform a data processing method comprising the steps of:
determining whether or not indication information on main data including at least one of audio data and image data exhibiting a reference frame rate $FR_r$ includes limitation information for limiting reproduction speed of said main data to a predetermined range of reproduction speeds having a maximum speed less than a fast reproduction speed selectable by a user, said indication information including set frame rate data ($FR_s$) representing a reproduction speed for said main data, $FR_s=nFR_r$ (n is an integer or a fraction), said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being greater than said reference frame rate $FR_r$, and being set for a predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data; and correcting indication information on said main data when it is determined in said determining step that said indication information indicates said limitation information.

32. A data processing apparatus comprising:
an editing device for editing main data including at least one of audio data and image data exhibiting a reference frame rate $FR_r$; and a combining device for combining said main data edited in said editing device with associated information, said associated information including set frame rate data ($FR_s$) representing a reproduction speed for said main data, $FR_s=nFR_r$ (n is an integer or a fraction), said associated information selectively including limitation information for limiting the reproduction speed of said main data to a predetermined range of reproduction speeds having a maximum speed less than a fast reproduction speed selectable by a user, and said associated information further including recommended data representing a recommended reproduction speed at which a reproduction device is set to reproduce a predetermined content of said main data, said recommended reproduction speed being within said predetermined range, said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being greater than said reference frame rate $FR_r$, and being set for said predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data.

33. The data processing apparatus according to claim 32, wherein said limitation information includes information for limiting a display size of image when reproducing the predetermined content of said main data.

34. The data processing apparatus according to claim 32, wherein said limitation information includes information for maintaining quality of said main data when reproducing the predetermined content of said main data.

35. A data processing method comprising the steps of:
editing main data including at least one of audio data and image data exhibiting a reference frame rate $FR_r$; and combining said main data edited in said editing step with associated information, said associated information including set frame rate data ($FR_s$) representing a reproduction speed for said main data, $FR_s=nFR_r$ (n is an integer or a fraction), said associated information selectively including limitation information for limiting the reproduction speed of said main data to a predetermined range of reproduction speeds having a maximum speed less than a fast reproduction speed selectable by a user, and said associated information further including recommended data representing a recommended reproduction speed at which a reproduction device is set to reproduce a predetermined content of said main data, said recommended reproduction speed being within said predetermined range, said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being greater than said reference frame rate $FR_r$, and being set for said predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data.

36. The data processing method according to claim 35, wherein said limitation information includes information for limiting a display size of image when reproducing said predetermined content of the main data.

37. The data processing method according to claim 35, wherein said limitation information includes information for maintaining quality of said main data when reproducing said predetermined content of the main data.

38. A non-transitory computer-readable recording medium storing a program for allowing a computer to perform a data processing method comprising the steps of:

editing main data including at least one of audio data and image data exhibiting a reference frame rate $FR_r$; and combining said main data edited in said editing step with associated information, said associated information including set frame rate data ($FR_s$) representing a reproduction speed for said main data, $FR_s=nFR_r$ (n is an integer or a fraction), said associated information selectively including limitation information for limiting the reproduction speed of said main data to a predetermined range of reproduction speeds having a maximum speed less than a fast reproduction speed selectable by a user, and said associated information further including recommended data representing a recommended reproduction speed at which a reproduction device is set to reproduce a predetermined content of said main data, said recommended reproduction speed being within said predetermined range, said user-selectable reproduction speed being a fast speed produced by skipping selected frames of said main data as a function of $FR_s$, and said user-selectable reproduction speed being a slow speed produced by repeating selected frames of said main data as a function of $FR_s$, said maximum speed of said predetermined range being greater than said reference frame rate $FR_r$ and being set for said predetermined content of said main data and not capable of being overridden by the user-selectable fast reproduction speed, thereby permitting said user to reproduce the predetermined content at a fast speed within said predetermined range and inhibiting said user from exceeding said maximum speed when reproducing the predetermined content of said main data.

39. A data processing apparatus comprising:

a determining device for determining whether or not main data including at least one of audio data and image data exhibiting a reference frame rate $FR_r$ is combined with associated information, said associated information including set frame rate data ($FR_s$) representing a reproduction speed for said main data, $FR_s=nFR_r$ (n is an integer or a fraction), said associated information selectively including limitation information for limiting the reproduction speed of said main data to a predetermined range of reproduction speeds having a maximum speed less than a maximum reproduction speed selectable by a user, and said associated information further including recommended data representing a recommended reproduction speed at which a reproduction device is set to reproduce a predetermined content of said main data, said recommended reproduction speed being within said predetermined range; and a reproducing device for selectively reproducing said predetermined content of said main data at the reproduction speed represented by said recommend data, at a fast reproduction speed that is produced by skipping selected frames of said main data as a function of $FR_s$, said fast reproduction speed being within said predetermined range based on said limitation information, and at a slow reproduction speed that is produced by repeating selected frames of said main data as a function of $FR_s$, the maximum reproduction speed at which said main data is reproduced being greater than said reference frame rate $FR_r$ and not capable of being overridden by the user-selectable fast reproduction speed, thereby permitting said user to reproduce the predetermined content at a fast speed within said predetermined range and inhibiting said reproducing device from exceeding said maximum reproduction speed when reproducing said predetermined content, when said determining device determines that said main data is combined with said associated information.

40. The data processing apparatus according to claim 39, wherein said limitation information includes information for limiting a display size of image when reproducing the main data; and wherein said reproducing device reproduces the predetermined content of said main data at the display size based on said limitation information.

41. The data processing apparatus according to claim 39, wherein said limitation information includes information for maintaining quality of said main data when reproducing the predetermined content of said main data; and wherein said reproducing device reproduces the predetermined content of said main data at the quality based on said limitation information.

42. The data processing apparatus according to claim 39, wherein said reproducing device reproduces said main data according to a condition set beforehand when said main data is not combined with said associated information.

43. The data processing apparatus according to claim 39 further comprising an adjusting device for adjusting a frame rate of said main data.

44. The data processing apparatus according to claim 43, wherein said adjusting device adjusts a frame rate of said main data when reproducing the predetermined content of said main data to a reproduction speed of said audio data and image data indicated by said associated information.

45. The data processing apparatus according to claim 43, wherein said adjusting device adjusts a frame rate of said main data, when reproducing the predetermined content of said main data, to the recommended reproduction speed of said audio data and image data indicated by said associated information.

46. A data processing method comprising the steps of:
determining whether or not main data including at least one of audio data and image data exhibiting a reference frame rate $FR_r$ is combined with associated information, said associated information including set frame rate data ($FR_s$) representing a reproduction speed for said main data, $FR_s=nFR_r$ (n is an integer or a fraction), said associated information selectively including limitation information for limiting the reproduction speed of said main data to a predetermined range of reproduction speeds having a maximum speed less than a maximum reproduction speed selectable by a user, and said associated information further including recommended data representing a recommended reproduction speed at which a reproduction device is set to reproduce a predetermined content of said main data, said recommended reproduction speed being within said predetermined range; and
selectively reproducing said predetermined content of said main data at the reproduction speed represented by said recommend data, at a fast reproduction speed that is produced by skipping selected frames of said main data as a function of $FR_s$ said fast reproduction speed being within said predetermined range based on said limitation information, and at a slow reproduction speed that is produced by repeating selected frames of said main data as a function of $FR_s$, the maximum reproduction speed at which said main data is reproduced being greater than said reference frame rate $FR_r$ and not capable of being overridden by the user-selectable fast reproduction speed, thereby permitting said user to reproduce the predetermined content at a fast speed within said predetermined range and inhibiting said reproducing device from exceeding said maximum reproduction speed when reproducing said predetermined content, when determining that said main data is combined with said associated information in said determining step.

47. The data processing method according to claim 46, wherein said limitation information includes information for limiting a display size of image when reproducing the main data; and wherein the predetermined content of said main data is reproduced at the display size based on said limitation information.

48. The data processing method according to claim 46, wherein said limitation information includes information for maintaining quality of said main data when reproducing the main data; and wherein the predetermined content of said main data is reproduced at the quality based on said limitation information.

49. The data processing method according to claim 46, wherein, in said reproducing step, said main data is reproduced according to a condition set beforehand when said main data is not combined with said associated information.

50. The data processing method according to claim 46 further comprising the step of adjusting a frame rate of said main data.

51. The data processing method according to claim 50, wherein, in said adjusting step, a frame rate of said main data when reproducing the predetermined content of said main data is adjusted to a reproduction speed of said audio data and image data indicated by said limitation information.

52. The data processing method according to claim 50, wherein, in said adjusting step, the frame rate of said main data when reproducing the predetermined content of said main data is adjusted to the reproduction speed of said audio data and image data indicated by said associated information.

53. A non-transitory computer-readable storage medium for storing program for allowing a computer to perform a data processing method, comprising the steps of:
determining whether or not main data including at least one of audio data and image data exhibiting a reference frame rate $FR_r$ is combined with associated information, said associated information including set frame rate data ($FR_s$) representing a reproduction speed for said main data, $FR_s=nFR_r$ (n is an integer or a fraction), said associated information selectively including limitation information for limiting the reproduction speed of said main data to a predetermined range of reproduction speeds having a maximum speed less than a maximum reproduction speed selectable by a user, and said associated information further including recommended data representing a recommended reproduction speed at which a reproduction device is set to reproduce a predetermined content of said main data, said recommended reproduction speed being within said predetermined range; and
selectively reproducing said predetermined content of said main data at the reproduction speed represented by said recommend data, at a fast reproduction speed that is produced by skipping selected frames of said main data as a function of $FR_s$ said fast reproduction speed being within said predetermined range based on said limitation information, and at a slow reproduction speed that is produced by repeating selected frames of said main data as a function of $FR_s$, the maximum reproduction speed at which said main data is reproduced being greater than said reference frame rate $FR_r$ and not capable of being overridden by the user-selectable fast reproduction speed, thereby permitting said user to reproduce the predetermined content at a fast speed within said predetermined range and inhibiting said reproducing device from exceeding said maximum reproduction speed when reproducing said predetermined content, when determining that said main data is combined with said associated information in said determining step.

* * * * *